United States Patent
Haga et al.

(10) Patent No.: US 11,368,338 B2
(45) Date of Patent: *Jun. 21, 2022

(54) MULTI-PROTOCOL VEHICLE RELAY COMMUNICATION METHOD, GATEWAY DEVICE, VEHICLE NETWORK SYSTEM, TRANSFER METHOD, AND NON-TRANSITORY COMPUTER-READABLE RECORDING MEDIUM STORING PROGRAM

(71) Applicant: PANASONIC INTELLECTUAL PROPERTY CORPORATION OF AMERICA, Torrance, CA (US)

(72) Inventors: Tomoyuki Haga, Nara (JP); Manabu Maeda, Osaka (JP); Takamitsu Sasaki, Osaka (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/929,918

(22) Filed: Jul. 15, 2020

(65) Prior Publication Data
US 2020/0351123 A1 Nov. 5, 2020

Related U.S. Application Data

(63) Continuation of application No. 16/169,039, filed on Oct. 24, 2018, now Pat. No. 10,756,930, which is a
(Continued)

(30) Foreign Application Priority Data

Mar. 10, 2017 (JP) .............................. JP2017-046311

(51) Int. Cl.
*H04L 12/66* (2006.01)
*H04L 12/40* (2006.01)
(Continued)

(52) U.S. Cl.
CPC ........ *H04L 12/66* (2013.01); *H04L 12/40006* (2013.01); *H04L 12/4625* (2013.01);
(Continued)

(58) Field of Classification Search
CPC ........... H04L 12/40006; H04L 12/4625; H04L 69/08; H04L 2012/40215; H04L 2012/40273
See application file for complete search history.

(56) References Cited

U.S. PATENT DOCUMENTS 10,756,930 B2 * 8/2020 Haga ................... H04L 12/4625
2014/0126584 A1 5/2014 Hwang et al.
(Continued)

FOREIGN PATENT DOCUMENTS

| CN | 103685000 A | 3/2014 |
|---|---|---|
| JP | 2015-139093 | 7/2015 |
| JP | 2016-111477 | 6/2016 |

OTHER PUBLICATIONS

English Translation of Chinese Search Report from the Patent Office of the People's Republic of China dated Sep. 15, 2020 for the related Chinese Patent Application No. 201780004577.1.
(Continued)

*Primary Examiner* — Benjamin H Elliott, IV
(74) *Attorney, Agent, or Firm* — Greenblum & Bernstein, P.L.C.

(57) ABSTRACT

A network system includes a first network through which a frame of a first type is transmitted in accordance with a first communication protocol and includes a second network in which a frame of a second type is transmitted in accordance
(Continued)

with a second communication protocol. A gateway device is connected to the first network and the second network. The gateway device sequentially receives frames of the first type from the first network and determines whether to transmit data regarding the received frames of the first type to the second network. The gateway device transmits, to the second network, a frame of the second type including data regarding a plurality of the frames of the first type determined to be transmitted to the second network when a condition relating to a number of frames of the first type received by the gateway device is satisfied.

17 Claims, 12 Drawing Sheets

Related U.S. Application Data continuation of application No. PCT/JP2017/015814, filed on Apr. 20, 2017.

(60) Provisional application No. 62/342,551, filed on May 27, 2016.

(51) Int. Cl.
    *H04L 12/46*     (2006.01)
    *H04L 69/08*     (2022.01)

(52) U.S. Cl.
    CPC .... *H04L 69/08* (2013.01); *H04L 2012/40215* (2013.01); *H04L 2012/40273* (2013.01)

(56) References Cited

U.S. PATENT DOCUMENTS

| | | |
|---|---|---|
| 2014/0133350 A1 | 5/2014 | Triess et al. |
| 2017/0155585 A1 | 6/2017 | Meng et al. |
| 2017/0339056 A1 | 11/2017 | Uno |
| 2018/0109622 A1 | 4/2018 | Galula et al. |
| 2018/0162295 A1 | 6/2018 | Honda et al. |
| 2019/0068407 A1 | 2/2019 | Haga et al. |
| 2020/0351123 A1* | 11/2020 | Haga ................ H04L 12/40006 |

OTHER PUBLICATIONS

International Search Report of PCT application No. PCT/JP2017/015814 dated Jul. 25, 2017.

Mitsuhiro Kitani et al., "Development of Data Communication Method In-Vehicle Network for Automated Driving", IPSJ SIG Technical Report, vol. 2016-GN-97, No. 21, Jan. 21, 2016, pp. 1-8 (Partial Translation).

Jun Matsumura et al., "CAN-Ethernet protocol convert algorithm for automotive networks", IPSJ SIG Technical Report, vol. 2013-EMB-28, No. 7, Mar. 3, 2013, pp. 1-6 (Partial Translation).

"CAN—Ethernet Gateway for Automotive Applications"; Postolache et al.; IEEE; 2013 (Year: 2013).

"CAN Gateway for Fast Vehicle to Vehicle (V2V) Communication"; Hwang et al.; IEEE; 2015 (Year: 2015).

"Gateway Framework for In-Vehicle Networks Based on CAN, FlexRay, and Ethernet"; Kim et al.; IEEE; Oct. 2015 (Year: 2015).

"A Parallel Re-programming Method for In-vehicle Gateway to save software update time"; Lee et al.; IEEE; Aug. 2015 (Year: 2015).

* cited by examiner

FIG. 3A

| SOF | ID FIELD (CAN-ID) | RTR | IDE | r | DLC (SIZE) | DATA FIELD (DATA) | CRC | DEL | ACK | DEL | EOF |
|---|---|---|---|---|---|---|---|---|---|---|---|
| 1 | 11 | 1 | 1 | 1 | 4 | 0–64 | 15 | 1 | 1 | 1 | 7 |

RECESSIVE / DOMINANT

FIG. 3B

| SOF | ID FIELD (PART OF CAN-ID) | SRR | IDE | ENHANCED ID (REST OF CAN-ID) | RTR | r1 | r0 | DLC (SIZE) | DATA FIELD (DATA) | CRC |
|---|---|---|---|---|---|---|---|---|---|---|
| 1 | 11 | 1 | 1 | 18 | 1 | 1 | 1 | 4 | 0–512 | 17/21 |

RECESSIVE / DOMINANT

FIG. 8

| SOURCE | CAN-ID TO BE TRANSFERRED | DESTINATION NETWORK TYPE | DESTINATION IDENTIFICATION INFORMATION |
|---|---|---|---|
| FIRST CAN BUS | 0x400, 0x500, 0x600 | CAN | SECOND CAN BUS |
| SECOND CAN BUS | ALL | CAN | FIRST CAN BUS |
| FIRST CAN BUS | 0x100, 0x101, 0x102 | E | MAC ADDRESS:00:11:22:33:44:55 |
| FIRST CAN BUS | 0x200, 0x201, 0x202 | E | MAC ADDRESS:00:12:34:56:78:90 |
| FIRST CAN BUS | 0x300, 0x301, 0x303 | E | MAC ADDRESS:00:12:23:34:45:56 |
| SECOND CAN BUS | 0x400, 0x401, 0x402 | E | MAC ADDRESS:00:11:22:33:44:55 |
| SECOND CAN BUS | 0x501, 0x501, 0x502 | E | MAC ADDRESS:00:12:34:56:78:90 |
| SECOND CAN BUS | 0x600, 0x601, 0x603 | E | MAC ADDRESS:00:12:23:34:45:56 |

FIG. 9

| SOURCE | CAN-ID HAVING PRIORITY IN TRANSFER | DESTINATION NETWORK TYPE | DESTINATION IDENTIFICATION INFORMATION |
|---|---|---|---|
| FIRST CAN BUS | 0x100 | E | MAC ADDRESS:00:11:22:33:44:55 |
| SECOND CAN BUS | 0x500, 0x501 | E | MAC ADDRESS:00:12:34:56:78:90 |

MULTI-PROTOCOL VEHICLE RELAY COMMUNICATION METHOD, GATEWAY DEVICE, VEHICLE NETWORK SYSTEM, TRANSFER METHOD, AND NON-TRANSITORY COMPUTER-READABLE RECORDING MEDIUM STORING PROGRAM

CROSS REFERENCE TO RELATED APPLICATIONS

This is a continuation of U.S. patent application Ser. No. 16/169,039, filed Oct. 24, 2018, which is a continuation of International Patent Appl. No. PCT/JP2017/015814, filed Apr. 20, 2017, which claims the benefit of U.S. Provisional Patent. Appl. No. 62/342,551, filed May 27, 2016, and priority to Japanese Patent Appl. No. 2017-046311, filed Mar. 10, 2017. The entire disclosure of each of the above-identified documents, including the specification, drawings, and claims, is incorporated herein by reference in its entirety.

BACKGROUND

1. Technical Field

The present disclosure relates to a message processing technique for relaying messages between electronic control units that communicate with one another in networks such as vehicle networks.

2. Description of the Related Art

In Japanese Unexamined Patent Application Publication No. 2016-111477, a gateway that relays messages between a device according to a CAN protocol and a device according to an Ethernet (registered trademark) protocol or the like is described.

SUMMARY

The above example of the related art requires further improvements.

In one general aspect, the techniques disclosed here feature a gateway device connected to a first network through which a frame of a first type is transmitted using the first network in accordance with a first communication protocol and connected to a second network through which a frame of a second type is transmitted in accordance with a second communication protocol, which is different from the first communication protocol. The gateway device includes a receiver that sequentially receives frames of the first type from the first network, a processor that determines whether to transmit data regarding the frames of the first type received by the receiver to the second network, and a transmitter that transmits, to the second network, the frame of the second type including data regarding a plurality of the frames of the first type determined by the processor to be transmitted to the second network.

According to the present disclosure, further improvements can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 3A and 3B are diagrams illustrating formats of a data frame (also referred to as a "CAN frame") specified in a controller area network (CAN) protocol;

FIG. 8 is a diagram illustrating an example of transfer rule information used by the gateway according to the first embodiment;

FIG. 9 is a diagram illustrating an example of a priority transfer list used by the gateway according to the first embodiment;

DETAILED DESCRIPTION

Figure 1:
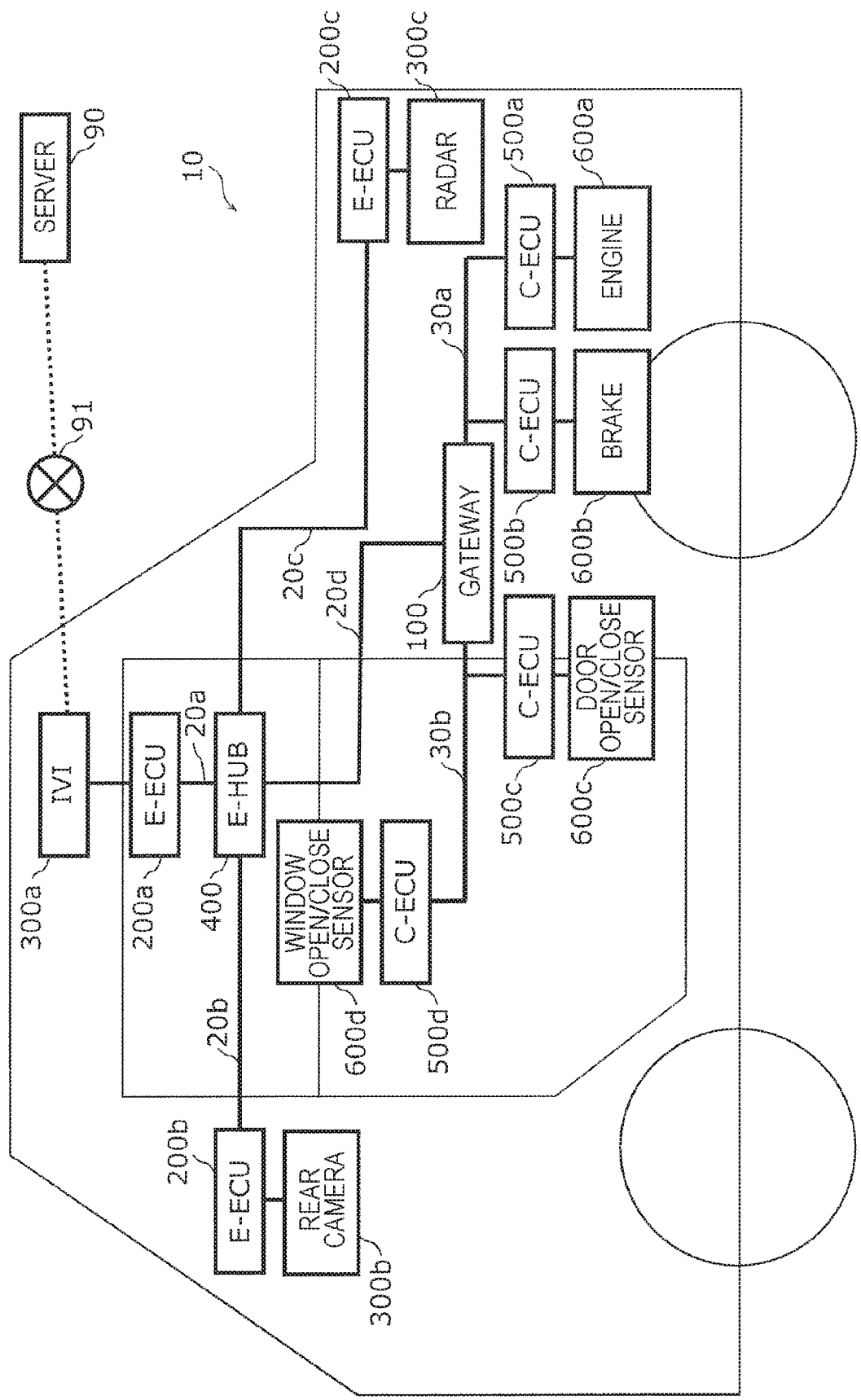
FIG. 1 is a diagram illustrating the overall configuration of a vehicle network system according to a first embodiment.

During these years, a large number of devices called electronic control units (ECUs) are provided in a system inside an automobile. A network connecting these ECUs with one another is called a vehicle network. A lot of standards exist for vehicle networks. A standard called controller area network (CAN) specified in International Organization for Standardization (ISO) 11898-1 is one of major vehicle networks. In CAN, ECUs (nodes) connected to a bus, which is a wired transmission path (communication path), communicate frames (messages). In addition, in CAN, there are no identifiers identifying destinations and sources. A transmission node transmits each frame with an identifier (CAN-ID) added (i.e., outputs a signal to a bus), and each reception node receives only messages having predetermined CAN-IDs (i.e., reads a signal from a bus). In addition, there is a standard called Ethernet (registered trademark) specified in IEEE 802.3 as a standard for transmitting a larger amount of information. A frame (message) in Ethernet (registered trademark) includes information indicating a source and a destination in a header thereof. In Ethernet (registered trademark), the maximum amount of data transmitted with a frame is larger than in CAN.

In Japanese Unexamined Patent Application Publication No. 2016-111477, a gateway that relays messages between a device according to a CAN protocol and a device according to an Ethernet (registered trademark) protocol or the like is described.

In a vehicle network system including an Ethernet (registered trademark) network and a CAN network, each ECU that communicates with other electronic control units includes at least either an Ethernet (registered trademark) interface or a CAN interface. In this case, cost undesirably increases if each electronic control unit that needs to communicate with an electronic control unit that has an Ethernet (registered trademark) interface and an electronic control unit connected to a CAN bus (i.e., an electronic control unit including a CAN interface) includes both types of interface. It is therefore desirable for an electronic control unit including only an Ethernet (registered trademark) interface to be able to transmit information to an electronic control unit connected to a CAN bus through a gateway device or the like. Japanese Unexamined Patent Application Publication No, 2016-111477, however, does not describe the configuration of a message to be transmitted when a gateway device relays (transfers) a message transmitted from an electronic control unit connected to a CAN bus (hereinafter also referred to as a "C-ECU") to an electronic control unit including an Ethernet (registered trademark) interface (hereinafter also referred to as a "E-ECU").

On the basis of the above examination, the present inventors have conceived aspects of the present disclosure.

A gateway device according to an aspect of the present disclosure is a gateway device connected to a first network through which a frame of a first type is transmitted using the first network in accordance with a first communication protocol and connected to a second network through which a frame of a second type is transmitted in accordance with a second communication protocol, which is different from the first communication protocol. The gateway device includes a receiver that sequentially receives frames of the first type from the first network, a processor that determines whether to transmit data regarding the frames of the first type received by the receiver to the second network, and a transmitter that transmits, to the second network, the frame of the second type including data regarding a plurality of the frames of the first type determined by the processor to be transmitted to the second network. The gateway device thus transfers (relays) a frame between the networks whose communication protocols are different from each other by sequentially receiving a frame of the first type transmitted from an ECU (an electronic control unit of a first type; e.g., a C-ECU) in the first network such as CAN and transmitting a frame of the second type including data regarding a plurality of frames of the first type to the second network. The data regarding the plurality of frames of the first type sequentially received from the first network can be stored in a buffer (a storage medium such as a memory) inside or outside the gateway device, for example, until the data is included in the frame of the second type and transmitted. By performing such transfer, transmission efficiency becomes higher than when data regarding a frame of a first type is individually transmitted to the second network as the content of the frame. That is, with the gateway device, information (data) from an ECU (e.g., a C-ECU) connected to the first network can be efficiently transmitted to an ECU (an electronic control unit of a second type; e.g., an E-ECU) connected to the second network.

In addition, the first network and the second network may be vehicle networks. The gateway device may be connected to an Ethernet (registered trademark) cable included in the second network. The first communication protocol may be a CAN (controller area network) protocol. The second communication protocol may be an Ethernet (registered trademark) protocol. The frame of the first type may include a CAN-ID and, in a data field, data. The frame of the second type may be an Ethernet (registered trademark) frame including an Ethernet (registered trademark) header and a payload. The transmitter may transmit the frame of the second type to the second network by outputting the frame of the second type to the Ethernet (registered trademark) cable. The frame of the second type (E frame) may include the content of a plurality of frames of the first type such as CAN-IDs, for example, as well as data (the content of data fields) regarding the plurality of frames of the first type (CAN frames). By relaying a frame with the gateway device, an E-ECU including only an Ethernet (registered trademark) interface, for example, can efficiently obtain information (data) transmitted from a C-ECU connected to a bus (CAN bus).

In addition, the processor may determine, on a basis of the CAN-ID of each of the frames of the first type received by the receiver, whether to transmit data regarding the frames of the first type to the second network. As a result, among CAN frames transmitted through the bus, only CAN frames having a CAN-ID specified in advance as a CAN-ID to be received by an E-ECU, for example, can be transmitted to the E-ECU. Data regarding unnecessary CAN frames, therefore, is not transferred to the second network.

In addition, the processor may also refer to reference information in which a plurality of destinations is associated with CAN-IDs and select, on the basis of the CAN-ID of each of the frames of the first type received by the receiver, one of the plurality of destinations as a destination of the data regarding the plurality of the frames of the first type to be transmitted to the second network. The transmitter may transmit, to the second network, the frame of the second type including the data regarding the plurality of the frames of the first type whose destinations selected by the processor are same. The destinations may be a single E-ECU or a plurality of E-ECUs of the same type (may be a subnetwork or the like to which these E-ECUs are connected). As a result, since data regarding CAN frames is transmitted using a frame of the second type (E frame) including a plurality of pieces of data whose destinations are the same, the data regarding the CAN frames can be efficiently transmitted to the destination E-ECU(s) and the like.

In addition, the frame of the second type transmitted by the processor may include destination information indicating the same destinations selected by the processor. As a result, an E frame need not be broadcast, for example, and can be efficiently transmitted to a destination indicated by destination information.

In addition, in the reference information, a plurality of media access control (MAC) addresses as the plurality of destinations may be associated with the CAN-IDs. The frame of the second type transmitted by the transmitter may include the data regarding the plurality of the frames of the first type having the same destinations selected by the processor in the payload, a MAC address, which is the same destinations, and a destination MAC address in an Ethernet (registered trademark) header. As a result, an E frame whose destination can be checked with a header is transmitted to the second network. Efficient transmission, therefore, becomes possible by referring to the header using a network hub (e.g., a switching hub) or the like and selecting a transfer path before the E frame reaches a destination E-ECU.

In addition, the processor may refer to reference information in which a plurality of destinations is associated with the CAN-IQs and select, on the basis of the CAN-ID of each of the frames of the first type received by the receiver, one of the plurality of destinations as a destination of the data regarding the plurality of the frames of the first type to be transmitted to the second network. The transmitter may transmit the frame of the second type including the data regarding the plurality of the frames of the first type determined by the processor to be transmitted to the second network and transmit destination information indicating the destination selected by the processor in the payload. As a result, a plurality of pieces of data to be transmitted to different destinations are included in a single E frame along with destination information and transmitted to the second network. Consequently, transmission efficiency before an E frame reaches a relay device or the like that divides data included in the E frame for destinations and that transmits the E frame to the destinations in the second network, for example, can be increased. The E frame, for example, may be broadcast and transmitted to E-ECUs, instead. In this case, the E-ECUs may extract necessary data from the E frame on the basis of the destination information and use the data.

In addition, the gateway device may be connected to a plurality of buses of the first network. The plurality of destinations, the plurality of buses, and the CAN-IDs may be associated in the reference information. The processor may refer to the reference information and select, on the basis of the CAN-ID and a source bus of each of the frames of the first type received by the receiver, one of the plurality of destinations as the destination of the data regarding the plurality of the frames of the first type to be transmitted to the second network. As a result, when associations between CAN-IDs of CAN frames and destinations are defined for each bus (CAN bus) as the reference information, data regarding a CAN frame can be appropriately transmitted to any E-ECU even if there are a plurality of buses.

In addition, the gateway device may be connected to a plurality of Ethernet (registered trademark) cables. The processor may refer to reference information in which the plurality of cables is associated with CAN-IDs and select, on the basis of the CAN-ID of each of the frames of the first type received by the receiver, one of the plurality of Ethernet (registered trademark) cables as a destination of the data regarding the plurality of the frames of the first type to be transmitted to the second network. The transmitter may transmit the frame of the second type including the data regarding the plurality of the frames of the first type whose Ethernet (registered trademark) cables selected by the processor as destinations are same, to the one of the plurality of Ethernet (registered trademark) cables. As a result, since a plurality of pieces of data regarding CAN frames determined to be transmitted to the same Ethernet (registered trademark) cable can be included in an E frame output to the cable, efficient transmission becomes possible.

In addition, in the frame of the second type, the data regarding the plurality of the frames of the first type determined by the processor to be transmitted to the second network may be arranged in order of predetermined priority levels of CAN-IDs based on CAN-IDs of the plurality of the frames of the first type. As a result, an E-ECU that has received a frame of the second type (E frame) can perform processing in consideration of priority levels of pieces of data included in the E frame.

In addition, in the frame of the second type, the data regarding the plurality of the frames of the first type determined by the processor to be transmitted to the second network may be arranged in order of reception by the receiver. As a result, an E-ECU that has received a frame of the second type (E frame) can perform processing in consideration of order in which pieces of data included in the E frame have been transmitted to a bus (CAN bus).

In addition, the transmitter may transmit the frame of the second type including the data regarding the plurality of the frames of the first type when a condition relating to a number of frames of the first type received by the receiver is satisfied. As a result, efficient data transmission can be achieved by appropriately setting the certain condition in consideration of transmission efficiency of a frame of the second type.

In addition, the transmitter may transmit the frame of the second type when a condition relating to time is satisfied as a result of counting of the time. As a result, appropriate data transmission can be achieved by appropriately setting the certain condition in consideration of; for example, a balance between transmission efficiency and transmission delay.

In addition, when the CAN-ID of one of the frames of the first type received by the receiver is a particular ID, the transmitter may transmit, to the second network, a frame of the second type including data regarding the one of the frames of the first type having the particular ID even when the certain condition is not satisfied. As a result, priority transfer (transfer without delay) of important information can be achieved, for example, by setting a CAN-ID of a CAN frame including important data (information) as a particular ID.

In addition, when transmitting the frame of the second type including the data regarding the one of the frames of the first type having the particular ID, the transmitter may: transmit the frame of the second type and include data regarding a second one of the frames of the first type that does not have the particular ID and that has been determined by the processor to be transmitted to the second network and has not yet been transmitted; or transmit another frame of the second type including the data regarding the second one of the frames of the first type that does not have the particular ID and that has been determined by the processor to be transmitted to the second network and has not yet been transmitted. As a result, when data (e.g., important data) regarding a CAN frame having a CAN-ID that is the particular ID received by the gateway device is transferred (transmitted) in a prioritized manner, data regarding a CAN frame having another CAN-ID received by the gateway device is transmitted. An E-ECU connected to the second network, therefore, can process the data (e.g., important data) regarding the CAN frame having the particular ID in consideration of a relationship with the data regarding the other CAN frame.

In addition, a vehicle network system according to an aspect of the present disclosure may include a plurality of electronic control units of a first type connected to a first network through which a frame of a first type is transmitted in accordance with a first communication protocol; an electronic control unit of a second type connected to a second network through which a frame of a second type is transmitted in accordance with a second communication protocol, which is different from the first communication protocol; and a gateway device connected to the first network and the second network. The gateway device includes a receiver that sequentially receives frames of the first type from the first network, a processor that determines whether to transmit data regarding the frames of the first type received by the receiver to the second network, and a transmitter that transmits, to the second network, the frame of the second type including data regarding a plurality of the frames of the first type determined by the processor to be transmitted to the second network. As a result, an ECU (e.g., a C-ECU) connected to a bus of the first network such as CAN can efficiently transmit information to an ECU (e.g., an E-ECU) connected to the second network such as Ethernet (registered trademark).

In addition, a transfer method according to an aspect of the present disclosure is a transfer method of a gateway device connected to a first network through which a frame of a first type is transmitted using the first network in accordance with a first communication protocol and connected to a second network through which a frame of a second type is transmitted in accordance with a second communication protocol, which is different from the first communication protocol. The transfer method includes sequentially receiving frames of the first type from the first network, determining, by a processor, whether to transmit data regarding the frames of the first type received in the receiving to the second network, and transmitting, to the second network, the frame of the second type including data regarding a plurality of the frames of the first type determined by the processor in the determining to be transmitted to the second network. As a result, an ECU connected to the bus of the first network can efficiently transfer a frame to the second network.

In addition, a program according to an aspect of the present disclosure is a program for causing a gateway device that is connected to a first network through which a frame of a first type is transmitted using the first network in accordance with a first communication protocol and connected to a second network through which a frame of a second type is transmitted in accordance with a second communication protocol, which is different from the first communication protocol, to perform operations including sequentially receiving frames of the first type from the first network, determining whether to transmit data regarding the frames of the first type received in the receiving to the second network, and transmitting, to the second network, the frame of the second type including data regarding a plurality of the frames of the first type determined in the determining to be transmitted to the second network. When the program is installed on the gateway device connected to the bus of the first network and the second network and including the microprocessor and executed, the gateway device can appropriately relay (transfer) information from an ECU (e.g., a C-ECU) connected to the bus of the first network to the second network.

It should be noted that these general or specific aspects may be implemented as a system, a method, an integrated circuit, a computer program, a computer-readable recording medium such as a CD-ROM, or any selective combination thereof.

A vehicle network system including a gateway device (gateway) and electronic control units (ECUs) according to each embodiment will be described hereinafter with reference to the drawings. The following embodiments are specific examples of the present disclosure. Values, components, arrangement and connection modes of the components, steps (processes), and the order of the steps mentioned in the following embodiments, therefore, are examples and do not limit the present disclosure. Among the components described in the following embodiments, ones not described in the independent claims are components that may be arbitrarily added. The drawings are schematic diagrams and not necessarily strict illustrations.

First Embodiment

A vehicle network system 10 including a plurality of electronic control units (ECUs) that communicate data through vehicle networks and a gateway will be described hereinafter with reference to the drawings as an embodiment of the present disclosure.

1.1 Overall Configuration of Vehicle Network System 10

FIG. 1 illustrates the overall configuration of the vehicle network system 10 according to a first embodiment.

The vehicle network system 10 is a network communication system in a vehicle provided with various devices such as control devices, sensors, actuators, and user interfaces. The vehicle network system 10 includes, as the vehicle networks, a first network (CAN network) in which data frames (CAN frames) and the like are transmitted in accordance with a CAN protocol using buses and a second network (Ethernet (registered trademark) network) through which Ethernet (registered trademark) frames (E frames) are transmitted in accordance with an Ethernet (registered trademark) protocol.

As illustrated in FIG. 1, the vehicle network system 10 is configured by including a gateway 100, electronic control units (E-ECUs) 200a to 200c, a network hub 400 (also referred to as an "E-hub"), electronic control units (C-ECUs) 500a to 500d, various devices (an in-vehicle infotainment (IVI) 300a, a rear camera 300b, a radar 300c, an engine 600a, a brake 600b, a door open/close sensor 600c, and a window open/close sensor 600d) connected to the electronic control units (the E-ECUs and the C-ECUs), cables (Ethernet (registered trademark) cables) 20a to 20d, and buses (CAN buses) 30a and 30b. The buses 30a and 30b are communication paths for the first network, and the Ethernet (registered trademark) cables 20a to 20d are communication paths for the second network.

The vehicle network system 10 can include a number of ECUs other than the E-ECUs 200a to 200c and the C-ECUs 500a to 500d. In addition to the C-ECUs 500a to 500d, C-ECUs that are not illustrated, for example, can be connected to the buses 30a and 30b.

The ECUs (the E-ECUs and the C-ECUs) are, for example, devices including processors (microprocessors), digital circuits such as memories, analog circuits, communication circuits, and the like. The memories are read-only memories (ROMs), random-access memories (RAMs), and the like and capable of storing programs (computer programs as software) to be executed by the processors. A nonvolatile memory may be included as a memory. The ECUs achieve various functions, for example, when the processors operate in accordance with the programs (computer programs). Each computer program is configured by combining a plurality of instruction codes indicating commands to a corresponding processor in order to achieve certain functions.

The C-ECUs 500a to 500d communicate frames in accordance with the CAN protocol. The C-ECUs 500a to 500d are connected to the engine 600a, the brake 600b, the door open/close sensor 600c, and the window open/close sensor 600d, respectively. The C-ECUs 500a to 500d obtain states of the corresponding devices and, for example, periodically transmit data frames indicating the states to the first network including the buses 30a and 30b and the like. The C-ECUs 500a to 500d receive data frames from the buses included in the first network, interpret the data frames, and determine whether the data frames include CAN-IDs to be received. The C-ECUs 500a to 500d can control the devices connected thereto in accordance with data (the content of data fields) of the frame frames as necessary, or generate and transmit data frames as necessary.

The gateway 100 is a kind of ECU as a gateway (a relay device or the like) connected to the buses 30a and 30b and the cable 20d. The gateway 100 includes a processor, a digital circuit such as a memory, an analog circuit, a communication circuit, and the like. The gateway 100 has a function of transferring (relaying) a frame received from a communication path (a bus or a cable) to another communication path. The transfer of a frame performed by the gateway 100 is relaying (i.e., reception and transmission) of data (information) regarding a frame and can accompany conversion of a communication method, a frame format, and the like for a communication protocol employed by a destination communication path. In addition, as the transfer of a frame between communication paths, the gateway 100 can receive one or a plurality of frames from one or a plurality of communication paths and transmit the one or plurality of frames to one or a plurality of communication paths. In the present embodiment, a transfer function of the gateway 100, by which data regarding a CAN frame received from a CAN bus of the first network is transmitted to another CAN bus of the first network or a cable of the second network, will be focused upon.

The E-ECUs 200a to 200c include Ethernet (registered trademark) interfaces and are connected to the Ethernet (registered trademark) cables. The E-ECUs 200a to 200c transmit or receive Ethernet (registered trademark) frames (E frames) in accordance with the Ethernet (registered trademark) protocol. The E-ECUs 200a to 200c are connected to the IVI 300a, the rear camera 300b, and the rear camera 300c, respectively, and perform processes based on information obtained from the corresponding devices. The E-ECUs 200a to 200c can control the corresponding devices as necessary, or transmit information to other ECUs as necessary. The IVI 300a is a device including a display and having multimedia functions such as playback of images, sounds, and the like and a communication function, by which the IVI 300a communicates with a server 90 outside the vehicle through an external network 91 such as the Internet. The server 90 is, for example, a computer having a function of providing information for the ECUs in the vehicle and the like.

The E-hub 400 is an Ethernet (registered trademark) switch (switching hub) connected to the gateway 100 and the E-ECUs 200a to 200c. The E-hub 400 includes, for example, a digital circuit such as a memory, an analog circuit, a communication circuit, and the like.

1.2 Configuration of Vehicle Networks

Figure 2:
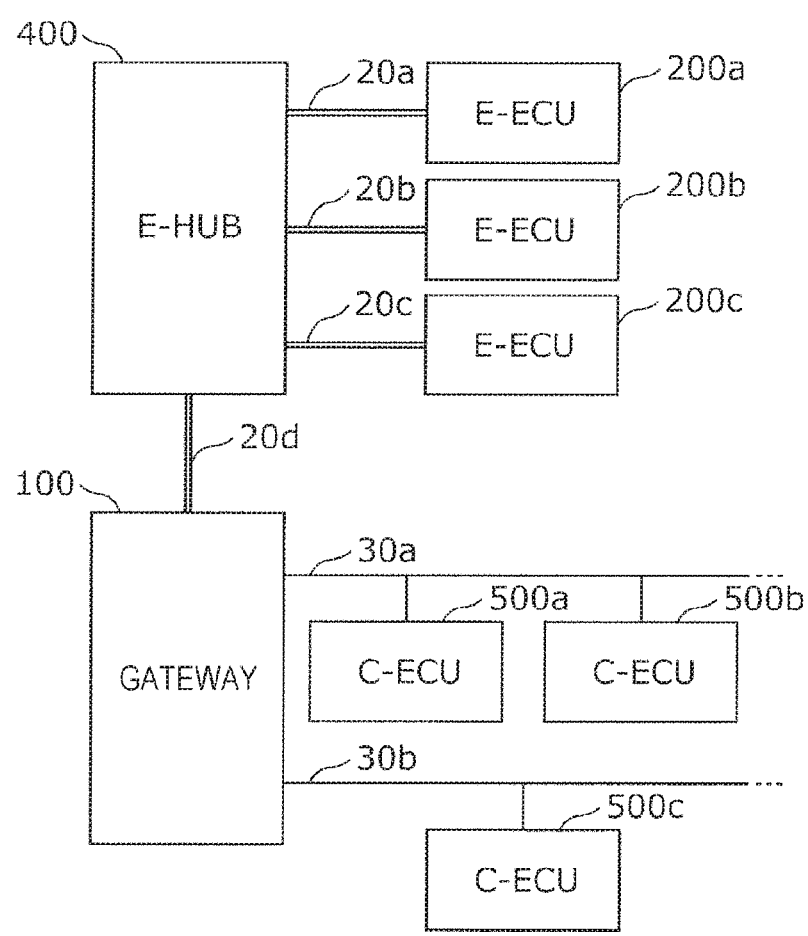
FIG. 2 is a diagram illustrating the schematic configuration of vehicle networks according to the first embodiment.

FIG. 2 illustrates the schematic configuration of the vehicle networks according to the present embodiment.

In the vehicle network system 10, the C-ECUs 500a to 500d can communicate with one another through the first network, which includes the buses 30a and 30b, the gateway 100, and the like. The gateway 100 and the E-ECUs 200a to 200c each include a unique MAC address and can communicate with one another through the second network, which is configured by connecting the cables through the E-hub 400. The E-hub 400 holds a MAC address table, for example, and, if receiving an E frame, learns a MAC address corresponding to a connection terminal (port) of each cable. The E-hub 400 also selects a destination port on the basis of a destination MAC address in a header of the received E frame in accordance with the MAC address table and outputs the E frame to a cable connected to the destination port to transfer the E frame.

The gateway 100 includes a port (i.e., a terminal to which an Ethernet (registered trademark) cable is connected) for connecting to the second network and a plurality of ports (connection terminals) for connecting to the bus 30a (also referred to as a "first CAN bus") and the bus 30b (also referred to as a "second CAN bus") of the first network. Information output from the C-ECU 500a, for example, can be transmitted to the E-ECU 200a through the bus 30a, the gateway 100, the cable 20d, the E-hub 400, and the cable 20a under a certain condition.

1.3 Configuration of Frames Communicated in Vehicle Network

In the first network, the C-ECUs 500a to 500d and the like communicate frames in accordance with the CAN protocol. Frames in the CAN protocol include a data frame, a remote frame, an overload frame, and an error frame. Here, the data frame will be mainly focused upon. FIGS. 3A and 3B illustrate formats of a data frame (CAN frame) communicated in the first network. FIG. 3A illustrates a standard format. In the standard format, a data frame includes a start of frame (SOF), an ID (CAN-ID), a remote transmission request (RTR), an identifier extension (IDE), a reserved bit "r", size, data, a cyclic redundancy check (CRC) sequence, a CRC delimiter "DEL", an acknowledgement (ACK) slot, an ACK delimiter "DEL", and an end of frame (EOF). Here, the ID (CAN-ID) as the content of an ID field is an identifier indicating a type of data and also called a message ID. In CAN, communication mediation, in which a frame having a smaller CAN-ID takes priority, is performed when a plurality of nodes have simultaneously started to perform transmission. The size is a data length code (DLC) indicating the length of a subsequent data field (data). Specifications of data (the content of the data field) are not specified in the CAN protocol but specified by the vehicle network system 10. The specifications of data, therefore, depend on a vehicle model, a manufacturer (manufacturing maker), and the like. FIG. 3B illustrates an enhanced format. Although the first network employs the standard format in the present embodiment, when the first network employs the enhanced format, 29 bits, which is the sum of an 11-bit base ID (a part of a CAN-ID) of an ID field and an 18-bit enhanced ID (the rest of the CAN-ID), may be treated as a CAN-ID.

Figure 4:
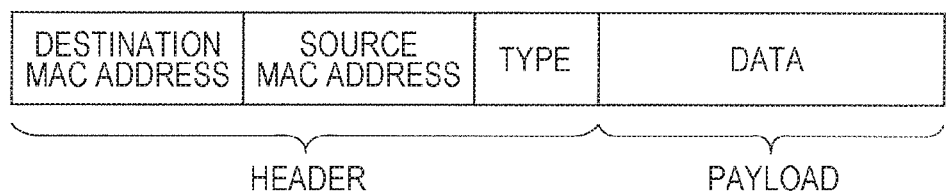
FIG. 4 is a diagram illustrating a format of an Ethernet (registered trademark) frame (also referred to as an "E frame") communicated in a part of the vehicle networks according to the first embodiment.

FIG. 4 illustrates a format of a frame (E frame) communicated in the second network. As illustrated in the figure, the E frame is configured by adding a header (Ethernet (registered trademark) header) before a payload storing data, which is main transmission content. The header includes a destination MAC address, a source MAC address, and a type.

When the gateway 100 in the vehicle network system 10 transfers a CAN frame received from a CAN bus to the second network connected to the E-ECUs, the gateway 100 transmits an E frame including a plurality of pieces of CAN frame information. The CAN frame information is information extracted from a data frame (CAN frame) transmitted through a CAN bus. The CAN frame includes at least the content of a data field (data) and can include, for example, a CAN-ID and size.

Figure 5:
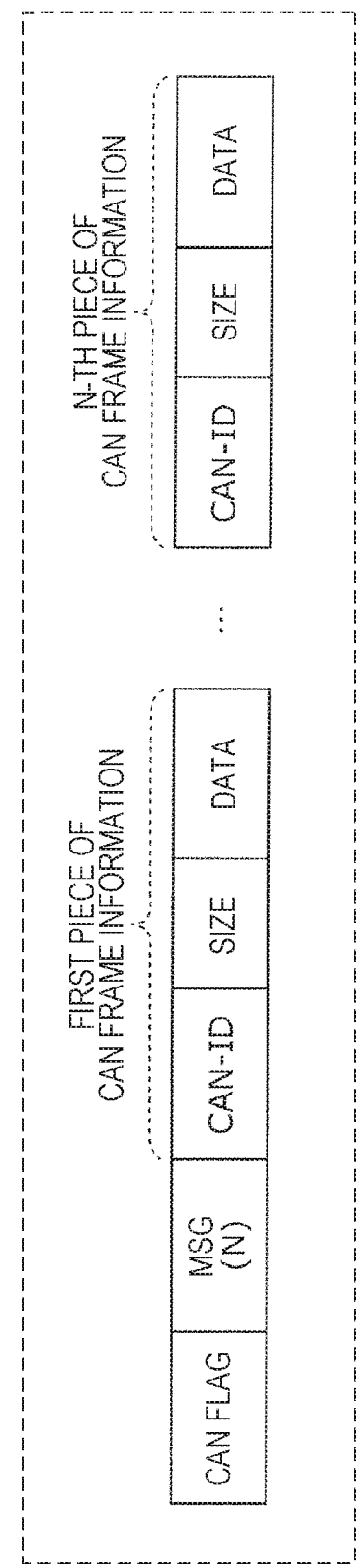
FIG. 5 is a diagram illustrating an example of the configuration of a payload of an E frame.

FIG. 5 illustrates an example of the data configuration of the payload of the E frame illustrated in FIG. 4. In the example illustrated in FIG. 5, CAN frame information includes a CAN-ID, size, and data. The number of messages (MSG) illustrated in FIG. 5 indicates the number of pieces of CAN frame information. Information indicating the total amount of data of the CAN frame information may be used instead of the number of messages. A CAN flag is an identification flag for identifying whether the E frame includes information transmitted from the first network (i.e., CAN frame information). The CAN flag is turned on when the payload of the E frame includes CAN frame information and turned off in other cases (i.e., values indicating information contrary to on). Although an example in which a CAN flag is arranged at a beginning of an E frame is illustrated in FIG. 5, this is just an example. By including a plurality of pieces of CAN frame information in a payload of an E frame as in the example of FIG. 5, for example, transmission efficiency can improve.

1.4 Configuration of Gateway 100

Figure 6:
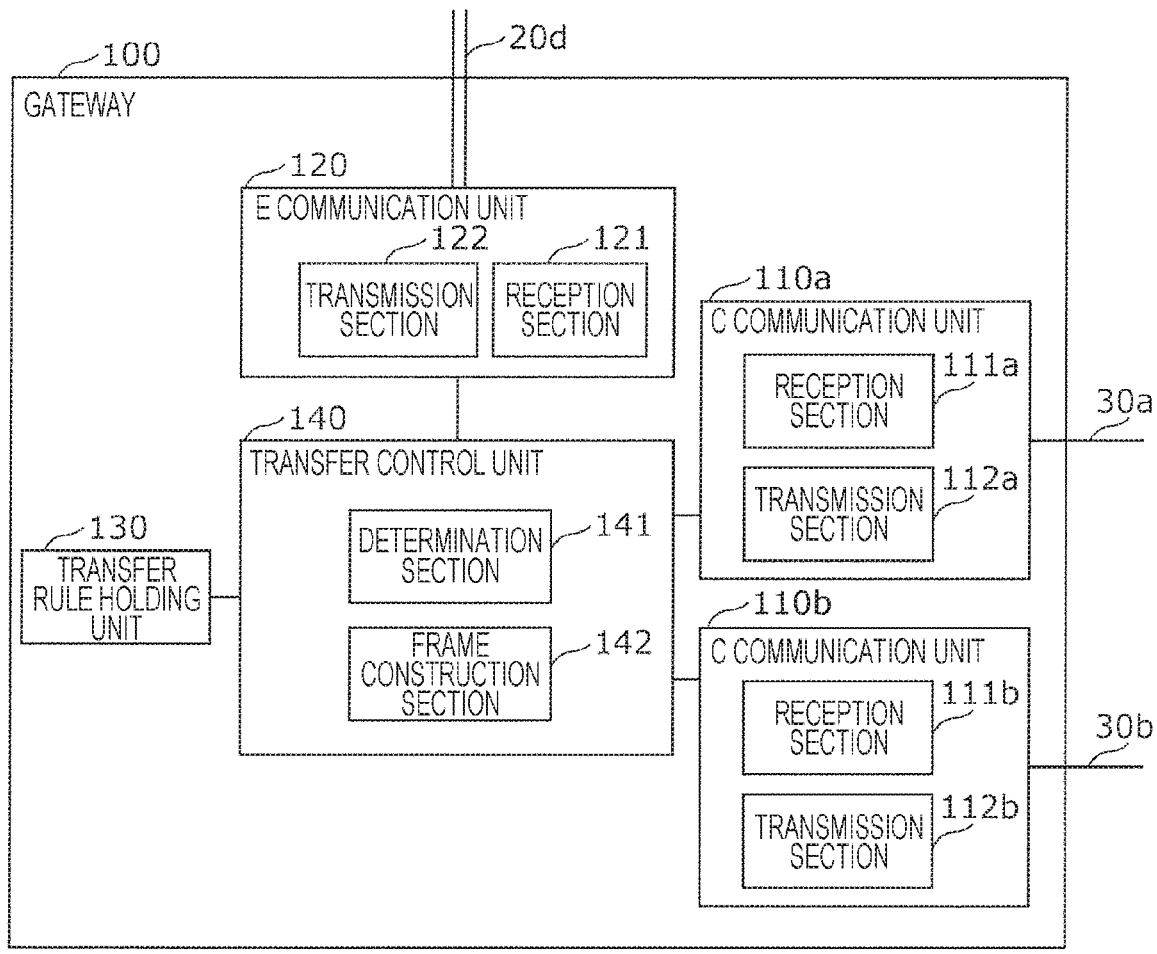
FIG. 6 is a configuration diagram of a gateway (gateway device) according to the first embodiment.

FIG. 6 is a configuration diagram of the gateway 100. As illustrated in FIG. 6, the gateway 100 is configured by including a C communication unit 110*a*, a C communication unit 110*b*, an E communication unit 120, a transfer rule holding unit 130, and a transfer control unit 140. These components are achieved in the gateway 100 by communication circuits, a memory, a digital circuit, a processor that executes programs stored in the memory.

The C communication unit 110*a* is a communication circuit or the like connected to the bus 30*a* included in the first network and includes a reception section 111*a* that sequentially receives CAN frames from the bus 30*a* and a transmission section 112*a* that transmits CAN frames to the bus 30*a*.

The C communication unit 110*b* is a communication circuit or the like connected to the bus 30*b* included in the first network and includes a reception section 111*b* that sequentially receives CAN frames from the bus 30*b* and a transmission section 112*b* that transmits CAN frames to the bus 30*b*.

The E communication unit 120 is a communication circuit or the like connected to the cable 20*d* (a wired communication path connected to the E-hub 400) included in the second network and includes a reception section 121 that receives E frames from the cable 20*d* and a transmission section 122 that transmits E frames to the cable 20*d*.

The transfer rule holding unit 130 is achieved by a storage medium such as a memory and holds reference information, which specifies a frame transfer condition and the like. The reference information is, for example, transfer rule information in which CAN-IDs to be transferred, source buses, and destinations (MAC addresses, etc.) are associated with one another, a priority transfer list in which CAN-IDs having priority in transfer, source buses, and destinations are associated with each other, or the like.

Figure 7:
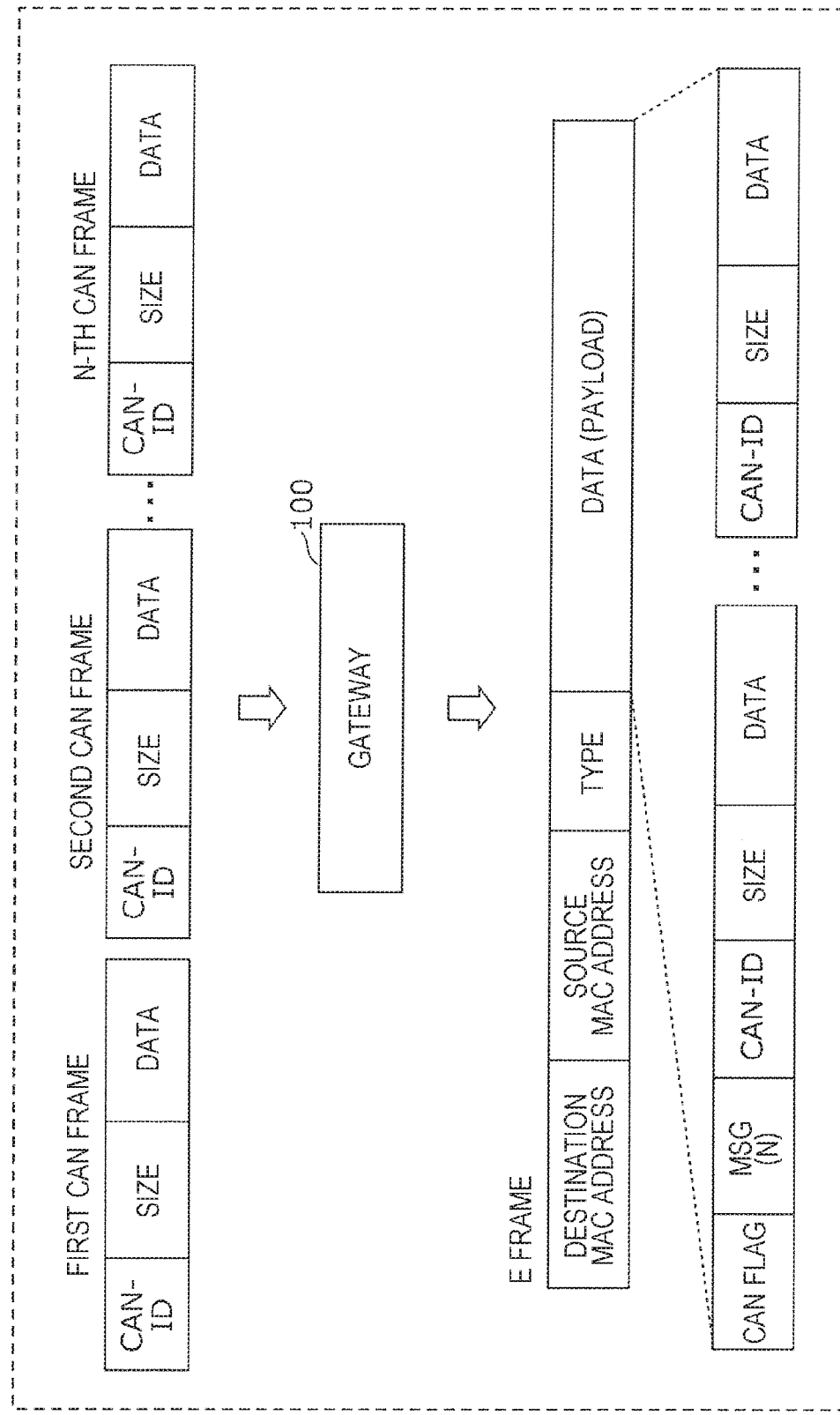
FIG. 7 is a diagram illustrating an example of a modification of a frame configuration at a time when the gateway according to the first embodiment transfers a frame.

The transfer control unit 140 is achieved, for example, by a processor or the like that executes programs. The transfer control unit 140 determines whether to transfer a received frame and performs control relating to transfer in accordance with a result of the determination. The control relating to transfer is, for example, control in which the E communication unit 120 is caused to transmit, to the cable 20*d*, an E frame including a plurality of pieces of CAN frame information in a payload on the basis of a plurality of sequentially received CAN frames. FIG. 7 illustrates an image of the gateway 100 transmitting an E frame on the basis of a plurality of received CAN frames (CAN frames 1 to N). As illustrated in the figure, when transferring the frame, the gateway 100 changes the configuration of the frame. A payload of the E frame to be transmitted includes, for example, N, which is a predetermined number, pieces of CAN frame information. Data regarding the N pieces of CAN frame information is the content (data) of data fields of N received CAN frames or the like. The content of CAN frames that have been received and are waiting for transfer are, for example, stored in a storage medium (buffer) such as the memory of the gateway 100. The E frame including the N pieces of CAN frame information illustrated in FIG. 7 is to be received, for example, by a destination E-ECU (e.g., E-ECU 200*a*) through the E-hub 400. A MAC address of the gateway 100 is set to a header of the E frame as a source MAC address, and a CAN flag that has been turned on, which indicates that CAN frame information is included, is set to the payload of the E frame. A MAC address of the destination E-ECU is set as a destination MAC address of the E frame in accordance with the transfer rule information or the like held by the transfer rule holding unit 130.

The transfer control unit 140 includes a determination section 141 and a frame construction section 142. The transfer control unit 140 controls a transmission unit (the transmission section 122, the transmission section 112*a*, or the transmission section 112*b*) under a certain condition in accordance with a result of a determination or the like made by the determination section 141 and causes the transmission unit to transmit a frame.

The determination section 141 determines whether to transmit, to the second network, data regarding a CAN frame received by the reception section 111*a* or the reception section 111*b* on the basis of a CAN-ID. The determination is made, for example, in accordance with the predetermined reference information regarding CAN-IDs. The determination section 141 also selects a destination of the data regarding the CAN frame in accordance with the reference information. The determination whether to transmit a CAN frame to the second network and the selection of a destination of a frame (an E frame or a CAN frame) including data regarding the CAN frame are performed, for example, using the transfer rule information indicating CAN-IDs or the like of one or more CAN frames whose data is to be transmitted to the second network.

FIG. 8 illustrates an example of the transfer rule information as the reference information held by the transfer rule holding unit 130 and referred to by the determination section 141 of the transfer control unit 140. As illustrated in the figure, the transfer rule information is information in which, for example, sources, CAN-IDs to be transferred, destination network types, and destination identification information are associated with one another. As the destination network types, E indicates the second network (E network), and CAN indicates the first network. The E network is the second network through which communication is performed in accordance with the Ethernet (registered trademark) protocol. When the destination network type is the E network, the destination identification information is a MAC address, and when the destination network type is CAN, the destination identification information is information for identifying a bus. The transfer rule information in the example illustrated in FIG. 8 indicates that when a CAN frame that has been received from the first CAN bus and whose CAN-ID is 0x400, 0x500, or 0x600 is to be transferred, the destination network type is CAN, and the CAN frame is to be transmitted to the second CAN bus among the plurality of CAN buses connected. The transfer rule information also indicates that all CAN frames received from the second CAN bus are to be transmitted to the first CAN bus. In addition, the transfer rule information indicates that when a CAN frame that has been received from the first CAN bus and whose CAN-ID is 0x100, 0x01, or 0x102 is to be transferred, the destination network type is the E network. CAN frame information, therefore, is to be stored in an E frame, and the E frame is to be transmitted with a destination MAC address thereof set as 00:11:22:33:44:55 (e.g., a MAC address of the E-ECU 200*a*).

The determination section 141 determines whether a bus that has received a CAN frame is the first CAN bus (bus 30a) or the second CAN bus (bus 30b). The determination section 141 then compares the bus with sources in the transfer rule information and a CAN-ID of the CAN frame with CAN-IDs to be transferred in the transfer rule information. If an applicable combination of a source and a CAN-ID to be transferred is found as a result of the comparison, the determination section 141 identifies a destination network type and destination identification information corresponding to the combination to select a destination of a frame based on the received CAN frame. If no applicable combination of a source and a CAN-ID to be transferred is found as a result of the comparison, the determination section 141 determines that the received CAN frame is not to be transmitted to the first or second network. If the destination network type indicates the E network in the selection of the destination, the determination section 141 determines that the received CAN frame is to be transmitted to the second network. In this case, the determination section 141 selects one of a plurality of MAC addresses as the destination identification information in the transfer rule information as a destination of an E frame including data and the like (CAN frame information) regarding the CAN frame to be transmitted to the second network. The reference information referred to by the determination section 141 may be, for example, a combination of a reception ID list indicating whether a CAN-ID is to be transferred and transfer rule information in which CAN-IDs to be transferred and destinations are associated with each other. Any type of reference information may be used. That is, the reference information may be a list of CAN-IDs not to be transferred, or may be a function or the like for determining whether a CAN-ID is to be transferred, instead. A destination (e.g., destination identification information indicated by the transfer rule information) in the reference information may be a MAC address, another type of identification information regarding an E-ECU (e.g., an Internet protocol (IP) address, etc.), or an address indicating a subnetwork to which a plurality of E-ECUs of the same type are connected.

If the determination section 141 determines that a plurality of sequentially received CAN frames are to be transmitted to the second network, the frame construction section 142 connects data (CAN frame information) regarding a plurality of (e.g., a predetermined number, namely N) CAN frames whose destinations selected by the determination section 141 are the same (e.g., the destinations are a MAC address of the same E-ECU) and turns on a CAN flag to construct an E frame (refer to FIG. 7). In this case, the frame construction section 142 sets the MAC address (a MAC address indicated by the destination identification information in the transfer rule information) of the destination as a destination MAC address in a header of the E frame. In this case, the transfer control unit 140 causes the transmission section 122 of the E communication unit 120 to output the E frame constructed by the frame construction section 142 to the cable 20d. When destinations are indicated by IP addresses of E-ECUs in the reference information, the frame construction section 142 may provide an IP header for a payload of the E frame (e.g., insert the IP header before the CAN flag illustrated in FIG. 7) and include an IP address of a destination E-ECU as a destination IP address of the IP header. The frame construction section 142 may then set a MAC address found on the basis of the IP address of the destination E-ECU as the destination MAC address of the E frame.

The frame construction section 142 may arrange a plurality of pieces of CAN frame information in any order when connecting the plurality of pieces of CAN frame information and setting the plurality of pieces of CAN frame information in a payload of an E frame, but the following method, for example, is effective. That is, CAN frame information (data and the like) regarding each of a plurality of CAN frames determined by the determination section 141 to be transmitted to the second network is arranged in an E frame in order of reception by the reception section 111a or 111b. With this method, an E-ECU that has received, through the E-hub 400, an E frame transmitted to the gateway 100 can perform processing in consideration of the order in which data included in the E frame has been transmitted to a CAN-bus. In another method, CAN frame information (data and the like) regarding each of a plurality of CAN frames determined by the determination section 141 to be transmitted to the second network is arranged in an E frame in order of predetermined priority levels of CAN-IDs based on CAN-IDs of the CAN frames. A predetermined priority level of a CAN-ID becomes higher, for example, as the CAN-ID increases as in the communication mediation between the CAN buses. With this method, an E-ECU that has received, through the E-hub 400, an E frame transmitted to the gateway 100 can perform processing based on the order of priority (e.g., the order of importance, etc.) of data included in an E frame.

If the determination section 141 selects either the first CAN bus or the second CAN bus as a destination of a CAN frame received from the other of the first CAN bus and the second CAN bus, the transfer control unit 140 controls a transmission section (the transmission section 112a or the transmission section 112b) such that the transmission section transmits the received CAN frame to the other of the first CAN bus and the second CAN bus as it is.

If the determination section 141 selects an E-ECU (i.e., a MAC address of the E-ECU) as a destination of a CAN frame received from a CAN bus, the transfer control unit 140 causes the frame construction section 142 to construct an E frame and the transmission section 122 to transmit the E frame when a certain condition relating to the number of CAN frames received by a reception section (the reception section 111a or the reception section 111b) has been satisfied for CAN frames whose destinations are the same. The certain condition relating to the number of CAN frames received is that, for example, N CAN frames whose destinations are the same be received (e.g., a CAN frame whose CAN frame information is to be included in an E frame for a destination be received N times after a previous E frame for the destination is transmitted). Alternatively, the certain condition relating to the number of CAN frames received may be that a total of M bytes of CAN frames whose CAN frame information is to be included in an E frame for a destination be received after a previous E frame for the destination is transmitted.

When a CAN-ID of a CAN frame received from a CAN bus is a particular ID, the transfer control unit 140 causes the frame construction section 142 to construct an E frame including CAN frame information (data and the like) regarding the CAN frame having the particular ID and the transmission section 122 to immediately transmit the E frame to the second network even if the certain condition relating to the number of CAN frames received is not satisfied. The particular ID is, for example, a CAN-ID having priority in transfer described in the priority transfer list as the reference information held by the transfer rule holding unit 130.

FIG. 9 illustrates an example of the priority transfer list as the reference information used by the transfer control unit 140. As illustrated in the figure, the priority transfer list is information in which, for example, sources, CAN-IDs having priority in transfer, destination network types, and destination identification information are associated with one another. The priority transfer list illustrated in FIG. 9 indicates, for example, that a CAN frame that has been received from the first CAN bus and whose CAN-ID is 0x100 be transferred to an E-ECU whose MAC address is 00:11:22:33:44:55 (e.g., the E-ECU 200a) without delay. If the transfer control unit 140 receives a CAN frame whose CAN-ID is 0x100 from the first CAN bus, therefore, the transfer control unit 140 causes the transmission section 122 to immediately transmit an E frame including CAN frame information, which is data and the like regarding the CAN frame, in a payload.

More specifically, the transfer control unit 140 determines whether a bus that has received the CAN frame is the first CAN bus (bus 30a) or the second CAN bus (bus 30b). The transfer control unit 140 then compares the bus with sources in the priority transfer list and a CAN-ID of the CAN frame with CAN-IDs having priority in transfer in the priority transfer list. If an applicable combination of a source and a CAN-ID having priority in transfer is found as a result of the comparison, the transfer control unit 140 identifies destination identification information corresponding to the combination to select a destination of an E frame based on the received CAN frame. A CAN-ID having priority in transfer (i.e., a particular ID) in the priority transfer list is, for example, a predetermined CAN-ID (error notification ID) for a CAN frame indicating an abnormality in driving control of the vehicle. When the gateway 100 promptly transmits, to the E-ECU 200a or the like, a CAN frame having the error notification ID transmitted from a C-ECU, for example, a display of the IVI 300a connected to the E-ECU 200a can promptly display a warning screen based on information regarding an error notification. An accident, therefore, can be effectively prevented. If CAN-IDs of CAN frames relating to the driving control of the vehicle such as driving, turning, and stopping are set as particular IDs in addition to the error notification ID, E-ECUs can promptly display information relating to the driving control, and safe driving of the vehicle can be effectively achieved. The transfer control unit 140 may determine particular IDs using any method instead of the one employing the priority transfer list. For example, the transfer control unit 140 may determine all CAN-IDs having values equal to or smaller than a predetermined threshold as particular IDs.

In addition, when the transfer control unit 140 causes the transmission section 122 to transmit an E frame including CAN frame information regarding a CAN frame having a particular ID, the transfer control unit 140 may cause the frame construction section 142 to generate another E frame including CAN frame information (data and the like) regarding one or a plurality of CAN frames that do not have a particular ID and that have been determined by the determination section 141 to be transmitted to the second network but have not yet been transmitted and the transmission section 122 to transmit the E frame. Alternatively, the transfer control unit 140 may cause the frame construction section 142 to further include CAN frame information regarding a CAN frame that does not have a particular ID and that has been determined by the determination section 141 to be transmitted to the second network but has not yet been transmitted in an E frame including CAN frame information regarding a CAN frame having a particular ID and construct an E frame and the transmission section 122 to transmit the E frame. More specifically, when a CAN-ID having priority in transfer (i.e., a particular ID) is 0x100 as in the example illustrated in FIG. 9 and the transfer control unit 140 has received a CAN frame having a CAN-ID of 0x100, the transfer control unit 140 may transmit, if CAN frames whose destinations are the same (MAC address 00:11:22:33:44:55) are accumulated and waiting for satisfaction of the certain condition relating to the number of CAN frames received (i.e., waiting for accumulation of N CAN frames), an E frame obtained by connecting CAN frame information regarding the accumulated CAN frames and CAN frame information regarding the CAN frame having the particular ID (0x100) to each other and including the connected CAN frame information in a payload.

In addition, the transfer control unit 140 may have a transmission control function of generating a CAN frame on the basis of the content of an E frame received by the reception section 121 of the E communication unit 120 and causing the transmission section 112a or the transmission section 112b to transmit the CAN frame to a CAN bus.

The transmission section 122 transmits, to the second network (i.e., the cable 20d), an E frame including data regarding a plurality of CAN frames determined by the determination section 141 to be transmitted to the second network under control performed by the transfer control unit 140. More specifically, the transmission section 122 transmits an E frame including CAN frame information regarding a plurality of CAN frames for which the same destination has been selected by the determination section 141 to the destination if the certain condition relating to the number of CAN frames received, whose CAN frame information is included in the E frame, is satisfied. Even while the certain condition is not satisfied, the transmission section 122 transmits, if a CAN frame having a particular ID is received, an E frame including CAN frame information regarding the CAN frame. When the transmission section 122 transmits an E frame including CAN frame information regarding a CAN frame having a particular ID, the transmission section 122 transmits the E frame while including, in the E frame, CAN frame information regarding a CAN frame that does not have a particular ID and that has been determined by the determination section 141 to be transmitted to the second network but has not yet been transmitted or transmits the E frame while including the CAN frame information in another E frame.

1.5 Operation of Gateway 100

Figure 10:
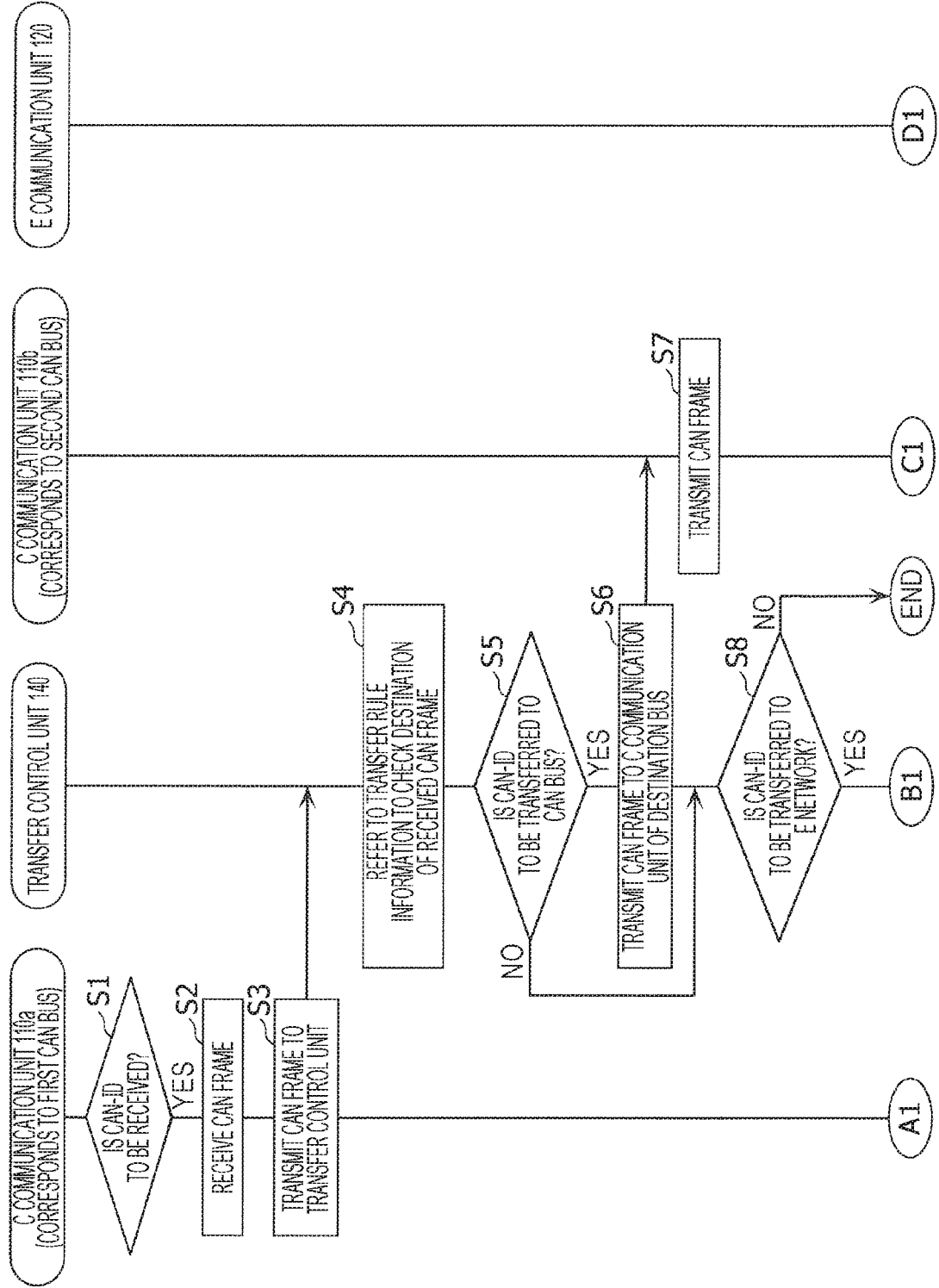
FIG. 10 is a diagram illustrating a transfer process sequence used by the gateway according to the first embodiment (continues to FIG. 11)
Figure 11:
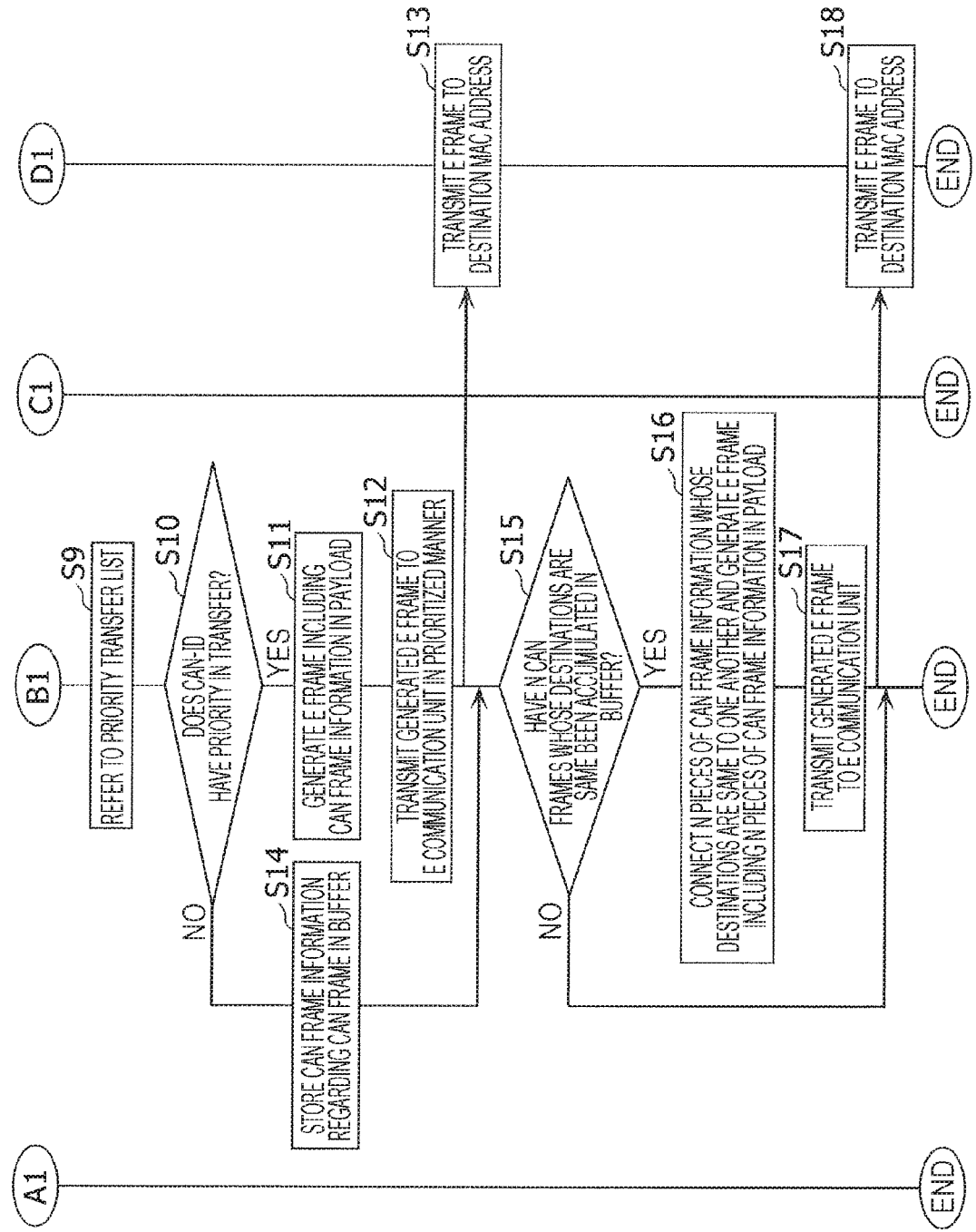
FIG. 11 is a diagram illustrating the transfer process sequence used by the gateway according to the first embodiment (continued from FIG. 10)

FIGS. 10 and 11 illustrate a specific example of a transfer process sequence relating to transfer of a CAN frame performed by the gateway 100. The transfer process sequence illustrated in FIGS. 10 and 11 indicates a transfer process achieved by cooperation between the C communication unit 110a, the transfer control unit 140, the C communication unit 110b, and the E communication unit 120 of the gateway 100. Here, the transfer of a CAN frame is transmission of a CAN frame that has been received or transmission of an E frame including CAN frame information regarding one or plurality of received CAN frames. A transfer process performed by the gateway 100 when a CAN frame received from the first CAN bus (bus 30a) of the first network is transferred to the second CAN bus (bus 30b) or the second network (E network) will be described hereinafter with reference to FIGS. 10 and 11. The transfer process starts when the gateway 100 has received a CAN frame from a CAN bus.

The C communication unit 110a connected to the first CAN bus receives, with the reception section 111a, a CAN- ID from the first CAN bus and determines whether the CAN-ID is to be received (step S1). The determination is made, for example, by referring to a reception ID list enumerating CAN-IDs to be received. The determination section 141 of the transfer control unit 140 may make the determination instead of the reception section 111a, which makes the determination on the basis of the reception ID list. In this case, the determination section 141 determines whether the CAN-ID is to be received (whether the CAN-ID is to be transferred) on the basis of the reception ID list of the transfer rule information.

If the C communication unit 110a determines in step S1 that the CAN-ID is to be received, the reception section 111a of the C communication unit 110a receives a corresponding CAN frame (step S2) and transmits the CAN frame to the transfer control unit 140 (step S3).

The transfer control unit 140 obtains and refers to the transfer rule information held by the transfer rule holding unit 130 in order to check a destination of the received CAN frame (step S4).

Next, the transfer control unit 140 determines, on the basis of the transfer rule information, whether the CAN-ID of the CAN frame is to be transferred to the second CAN bus (step S5), If so, the transfer control unit 140 transmits the CAN frame to the C communication unit 110b (step S6).

The C communication unit 110b that has received the CAN frame transmits the CAN frame to the second CAN bus with the transmission section 112b (step S7).

If the transfer control unit 140 determines in step S5 that the CAN-ID of the CAN frame is not to be transferred to the second CAN bus, or after the CAN frame is transmitted in step S6, the transfer control unit 140 determines whether the CAN-ID of the CAN frame is to be transferred to the second network (E network) (step S8). If the transfer control unit 140 determines in step S8 that the CAN-ID is not to be transferred to the E network, the gateway 100 ends the transfer process.

If determining in step S8 that the CAN-ID of the CAN frame (the CAN frame received in step S2) is to be transferred to the E network, the transfer control unit 140 obtains and refers to the priority transfer list held by the transfer rule holding unit 130 in order to check whether the CAN frame has priority (promptness) in transfer (step S9). The transfer control unit 140 then determines whether the CAN-ID of the CAN frame is described in the priority transfer list (a CAN-ID having priority in transfer) (step S10).

If determining in step S10 that the CAN-ID of the CAN frame is a CAN-ID having priority in transfer, the transfer control unit 140 generates an E frame including, in a payload, CAN frame information regarding the CAN frame and a CAN flag that has been turned on (step S11). A MAC address (a MAC address of a destination E-ECU) indicated in a corresponding piece of transfer identification information in the priority transfer list is set as a destination MAC address in a header of the E frame. The MAC address of the gateway 100, for example, is set as a source MAC address in the header of the E frame.

Next, the transfer control unit 140 transmits the E frame generated in step S11 to the E communication unit 120 in a prioritized manner (immediate transmission) in order to transmit the E frame to the destination (step S12). Upon receiving the E frame, the transmission section 122 of the E communication unit 120 transmits the E frame (step S13).

If determining in step S10 that the CAN-ID of the CAN frame does not have priority in transfer, the transfer control unit 140 stores the CAN frame information including the CAN-ID, size, and data of the CAN frame in the buffer (the storage medium included in the gateway 100) while associating the CAN frame information with the destination (MAC address) selected on the basis of the transfer rule information (step S14).

After step S12 or S14, the transfer control unit 140 determines whether the certain condition relating to the number of CAN frames received is satisfied, that is, whether N pieces of CAN frame information whose destinations are the same have been accumulated in the buffer (step S15).

If determining in step S15 that the certain condition is satisfied (i.e., N pieces of CAN frame information whose destinations are the same have been accumulated), the transfer control unit 140 generates an E frame including, in a payload, a CAN flag that has been turned on and the N pieces of CAN frame information whose destinations are the same (step S16). A MAC address of the destination based on the transfer rule information is set as a destination MAC address in a header of the E frame, and the MAC address of the gateway 100, for example, is set as a source address in the header.

Next, the transfer control unit 140 transmits the E frame generated in step S16 to the E communication unit 120 in order to transmit the E frame to the destination (step S17). Upon receiving the E frame, the transmission section 122 of the E communication unit 120 transmits the E frame (step S18).

If the transfer control unit 140 determines in step S15 that the certain condition is not satisfied, the gateway 100 ends the transfer process and waits for a next CAN frame to be received.

1.6 Advantageous Effects Produced by First Embodiment

In the vehicle network system 10 according to the first embodiment, if the gateway 100 receives a CAN frame transmitted from a C-ECU to a CAN bus in the vehicle networks including the first and second networks whose communication protocols are different from each other, the gateway 100 transfers the frame by transmitting information (CAN frame information) such as data regarding the CAN frame with an E-ECU set as a destination under a certain condition. During the transfer, the gateway 100 transmits an E frame including CAN frame information regarding a plurality of received CAN frames whose destinations are the same E-ECU and a CAN flag that has been turned on to the E-ECU. As a result, transmission efficiency can improve. In addition, if the gateway 100 receives a CAN frame having a particular ID, the gateway 100 transfers the frame by immediately transmitting an E frame including CAN frame information regarding the CAN frame to a particular E-ECU. As a result, the content of a CAN frame or the like having a particular ID can be promptly transmitted to an E-ECU. That is, although the vehicle network system 10 employs a transfer method with which a delay can be caused in transmission of information regarding a frame in order to increase transmission efficiency of the information, important information can be promptly transmitted from a C-ECU to an E-ECU by, for example, setting a CAN-ID of an important CAN frame as a particular ID.

Second Embodiment

An example will be described hereinafter in which the gateway 100 of the vehicle network system 10 (refer to FIG. 1) according to the first embodiment is partly modified.

2.1 Gateway 100a

A vehicle network system according to the present embodiment includes a gateway 100a having the same configuration as the gateway 100 (refer to FIG. 6) of the vehicle network system 10 according to the first embodiment. A function of a transfer control unit 140 of the gateway 100a, however, is partly different from that of the transfer control unit 140 of the gateway 100. In the vehicle network system according to the present embodiment, the same components as those according to the first embodiment are given the same reference numerals as in the first embodiment, and description thereof is omitted as necessary. The vehicle network system according to the present embodiment is the same as the vehicle network system 10 according to the first embodiment, unless otherwise specified.

If the transfer control unit 140 of the gateway 100 according to the first embodiment determines that a plurality of sequentially received CAN frames are to be transmitted to the second network, the transfer control unit 140 constructs an E frame obtained by connecting CAN frame information regarding a plurality of (e.g., the predetermined number, namely N) CAN frames whose destinations selected on the basis of the reference information (the transfer rule information, etc.) are the same (e.g., the destinations are a MAC address of the same E-ECU) and including the connected CAN frame information in a payload (refer to FIG. 7).

If the transfer control unit 140 of the gateway 100a determines that a plurality of sequentially received CAN frames are to be transmitted to the second network, on the other hand, the transfer control unit 140 constructs an E frame obtained by connecting CAN frame information regarding a plurality of (e.g., the predetermined number, namely N) CAN frames and including the connected CAN frame information in a payload regardless of destinations selected on the basis of the reference information (the transfer rule information, etc.) and causes the transmission section 122 to transmit the E frame to the second network. The configuration of the E frame at this time, for example, is as illustrated in FIG. 12.

Figure 12:
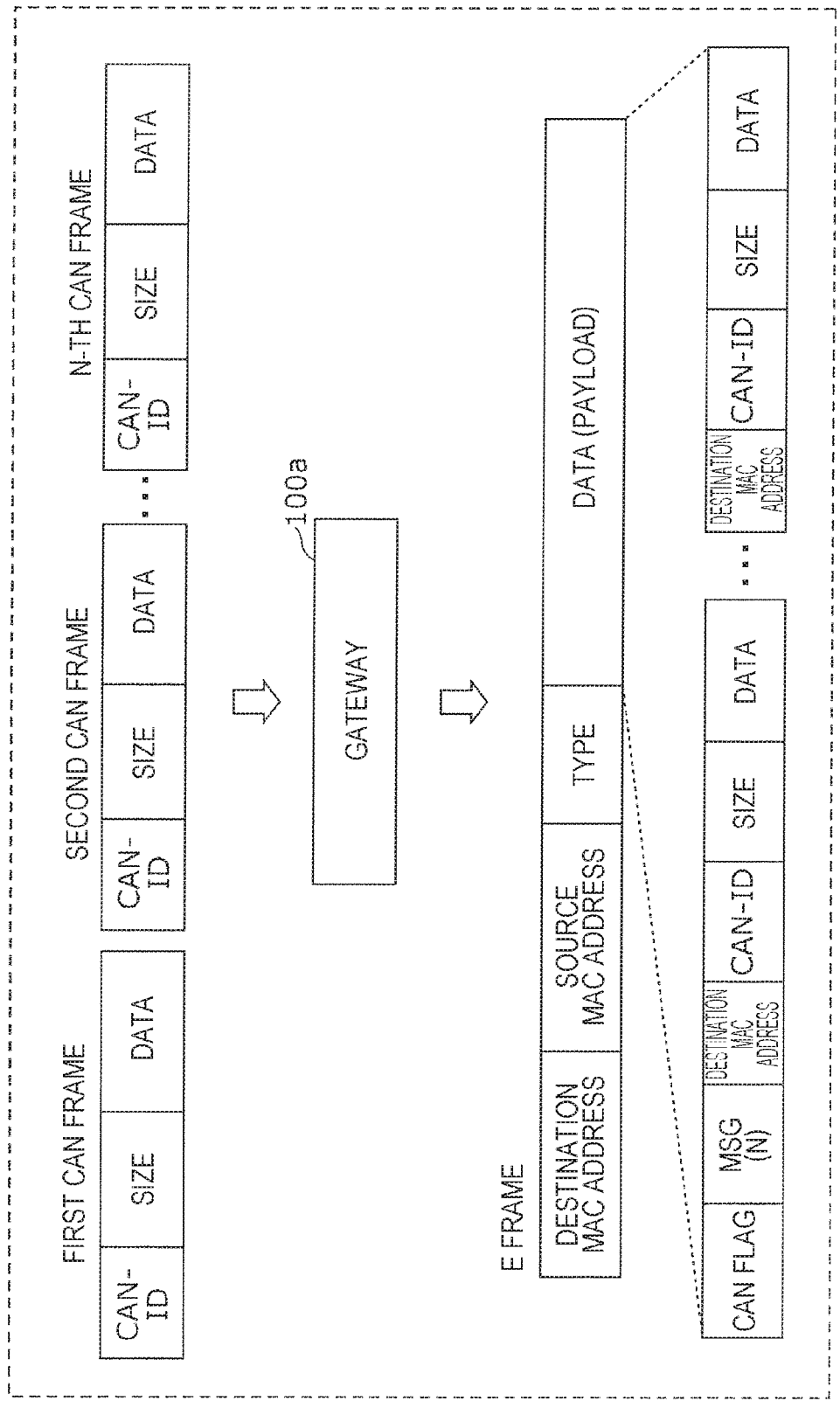
FIG. 12 is a diagram illustrating an example of a modification of a frame configuration at a time when a gateway according to a second embodiment transfers a frame.

FIG. 12 illustrates an image of the gateway 100a transmitting an E frame on the basis of a plurality of received CAN frames (first to N-th CAN frames). A payload of the E frame to be transmitted includes, for example, a predetermined number of, namely N, pieces of CAN frame information (CAN-IDs, size, and data) to which destination MAC addresses (i.e., MAC addresses of destination E-ECUs) indicating destinations are added. Data regarding the N pieces of CAN frame information is the content (data) of data fields or the like of the received N CAN frames. For example, broadcast addresses are set as destination MAC addresses in a header of the E frame, the MAC address of the gateway 100a is set as a source MAC address in the header of the E frame, and a CAN flag that has been turned on, which indicates that CAN frame information is included, is set in the payload of the E frame. The E frame including the N pieces of CAN frame information to which the destination MAC addresses are added illustrated in FIG. 12, for example, is to be received by the E-ECUs (the E-ECUs 200a to 200c, etc.) through the E-hub 400. When the E-hub 400 has received an E frame whose destination MAC address is a broadcast address, the E-hub 400 outputs the E frame from all ports other than a port with which the E frame has been received (i.e., a connection terminal for a cable). The E-ECUs can extract the CAN frame information intended therefor included in the E frame by comparing the destination MAC addresses in the payload of the E frame with MAC addresses thereof.

The E-hub 400 that has received an E frame including a plurality of pieces of CAN frame information corresponding to a plurality of destinations such as that illustrated in FIG. 12 may have a division transfer function of dividing the plurality of pieces of CAN frame information in a payload of the E frame for destinations (destination MAC addresses) and outputting, for each destination, an E frame from a port leading to an E-ECU indicated by the destination while including CAN frame information corresponding to the destination in a payload and setting the destination MAC address as a destination MAC address in a header. An E-hub having such a division transfer function may determine whether to implement the division transfer function or a general function of transferring an E frame, for example, depending on whether a CAN flag in a payload of an E frame is on. If an E-hub having the division transfer function and a MAC address is connected to the second network, it is effective for the gateway 100a to set, when transmitting an E frame, not a broadcast address but a MAC address of the E-hub as a destination MAC address in a header of the E frame. If a destination indicated by the destination identification information in the transfer rule information (refer to FIG. 8) is an address indicating a subnetwork to which a plurality of E-ECUs of the same type are connected, the gateway 100a may construct, with the configuration illustrated in FIG. 12, an E frame including a plurality of pieces of CAN frame information whose destinations are the E-ECUs of the same type and transmit the E frame to the second network.

2.2 Advantageous Effects Produced by Second Embodiment

In the vehicle network system according to the second embodiment, the gateway 100a transmits an E frame including CAN frame information regarding a plurality of CAN frames to the second network on the basis of the plurality of CAN frames received from a bus of the first network regardless of destinations. As a result, transmission efficiency can improve to some degree.

Other Embodiments

The first and second embodiments have been described above as examples of the technique in the present disclosure. The technique in the present disclosure, however, is not limited to this and may be applied to embodiments obtained by performing modification, replacement, addition, omission, and the like as necessary. The following modifications, for example, are included in an aspect of the present disclosure.

(1) The vehicle network system according to each of the above embodiments may include an E-hub connected to the second network and having the division transfer function in addition to the E-hub 400 that does not have the division transfer function. For example, the gateway 100a according to the second embodiment may sequentially receive CAN frames and transmit the E frame illustrated in FIG. 12 to the E-hub 400. The E-hub 400 may then transfer the E frame to the E-hub having the division transfer function, and the E-hub having the division transfer function may divide a plurality of pieces of CAN frame information included in the E frame and transmit, to each destination, an E frame including CAN frame information corresponding to an E-ECU as the destination.

(2) Although the vehicle network system has been described in the above embodiments, the above-described devices such as the gateways, the ECUs (the E-ECUs and the C-ECUs) and the E-hub may also be used for various network communication systems such as robots and industrial machines.

(3) In the above embodiments, the vehicle networks include the first and second networks. The first network transmits a CAN frame (data frame) in accordance with the CAN protocol using a CAN bus, and the second network transmits an E frame (Ethernet (registered trademark) frame) in accordance with the Ethernet (registered trademark) protocol. The CAN protocol may be interpreted in a broad sense and include derivative protocols such as CAN-open, which is used for a system incorporated into an automated system, time-triggered CAN (TTCAN), and CAN with flexible data rate (CAN FD). A data frame in the CAN protocol may have an enhanced ID format as well as a standard ID format. An Ethernet (registered trademark) frame may be, for example, a frame of Ethernet (registered trademark) version 2 or a frame specified in IEEE 802.3. The Ethernet (registered trademark) protocol may be interpreted in a broad sense and include derivative protocols such as Ethernet (registered trademark) audio video bridging (AVB) according to IEEE 802.1, Ethernet (registered trademark) time-sensitive networking (TSN) according to IEEE 802.1, Ethernet (registered trademark) industrial protocol (Ethernet/IP), and Ethernet (registered trademark) for Control Automation Technology (EtherCAT; registered trademark). In the first network, a frame of a first type (e.g., a CAN frame, etc.) may be transmitted through a bus in accordance with a first communication protocol, and a frame of a second type (e.g., an E frame, etc.) may be transmitted in accordance with a second communication protocol, which is different from the first communication protocol. In this case, the first communication protocol is the CAN protocol, for example, but may be local interconnect network (LIN), Media Oriented Systems Transport (MOST; registered trademark), or FlexRay (registered trademark), instead. The second communication protocol is the Ethernet (registered trademark) protocol, for example, but may be a BroadR-Reach protocol, instead. Through the vehicle networks including the first and second networks, information that has been transmitted by an electronic control unit of a first type (e.g., a C-ECU) connected to the first network can be transmitted to an electronic control unit of a second type (e.g., an E-ECU) connected to the second network. Ethernet (registered trademark) described in the above embodiments has a higher communication speed than CAN. In this sense, the second communication protocol may be one of various protocols having a higher communication speed than the first communication protocol. In addition, although a frame of the second type (e.g., an E frame) includes an identification flag (e.g., a CAN flag) for determining whether a payload of the frame of the second type includes data and the like (e.g., CAN frame information) regarding a frame of the first type (e.g., a CAN frame) to be transmitted to the second network in the above embodiments, the identification flag may be included in a header of the frame of the second type, instead. The gateway 100, for example, may include a CAN flag in a header of an E frame. As a result, whether a payload includes CAN frame information can be determined just by referring to the header of the E frame, and when the payload of the E frame has been encrypted, for example, processing can be simplified (omission of decryption, etc.). For example, a bit for determining whether a destination MAC address in a header of an E frame is a global MAC address may be used as a CAN flag (e.g., a value indicating a local MAC address is treated as a CAN flag that has been turned on). Alternatively, for example, a CAN flag may be provided for a field of a type in a header of an E frame. Alternatively, for example, the gateway 100 may include a CAN flag in both a header and a payload of an E frame.

(4) Although an example in which the gateway 100 is connected to the Ethernet (registered trademark) 20d in relation to the second network has been described in the above embodiment, the gateway 100 may include ports connected to a plurality of Ethernet (registered trademark) cables, instead. That is, the gateway 100 may be integrated with the E-hub 400. In this case, the gateway 100 can select a destination of a CAN frame on the basis of the reference information such as the transfer rule information, identify a port connected to a cable corresponding to the destination in a MAC address table, for example, and transmit an E frame to the port. More specifically, the determination section 141 of the transfer control unit 140 of the gateway 100 refers to the reference information (e.g., the transfer rule information and the MAC address table, etc.) in which a plurality of cables and CAN-IDs are associated with each other and selects, on the basis of a CAN-ID of a CAN frame received by the reception section 111a or 111b, one of the plurality of cables as a destination of CAN frame information, which is data and the like regarding the CAN frame to be transmitted to the second network. The transfer control unit 140 then constructs, with the frame construction section 142, an E frame including CAN frame information, which is data and the like regarding a plurality of CAN frames for which the same cable has been selected by the determination section 141 as a destination of CAN frame information and controls the transmission section 122 in such a way as to output the E frame to the selected cable, in order to achieve transmission of the E frame to the second network. Alternatively, the gateway 100 may select a plurality of cables and output, to the plurality of cables, E frames having the same payload including one or plurality of pieces of CAN frame information. In this case, the gateway 100 need not have a function as a switch (switching hub) and may output the E frames to all the cables without distinguishing destination MAC addresses of the E frames.

(5) In the above embodiment, if the certain condition relating to the number of CAN frames sequentially received is satisfied (e.g., N pieces of CAN frame information whose destinations are the same have been accumulated in the buffer), the gateway 100 transmits an E frame including CAN frame information regarding the CAN frames to the second network. A certain condition relating to time may be used in addition to, or instead of, this certain condition. That is, the gateway 100 may count time, and, if the certain condition relating to time is satisfied, an E frame including CAN frame information that has been accumulated in the buffer, whose destinations are the same, and that has not been transmitted may be generated, and the transmission section 122 may transmit the E frame to the second network. The certain condition relating to time, for example, is a condition that is satisfied when a predetermined period of time has elapsed since a previous E frame was output.

(6) Although the gateway 100 is connected to a plurality of CAN buses in relation to the first network in the above embodiment, the gateway 100 may be connected to a single CAN bus, instead. In this case, information regarding sources may be omitted, for example, in the transfer rule information and the priority transfer list.

(7) Although an example in which CAN frame information included in an E frame transmitted by the gateway 100 includes a CAN-ID, size, and data in the above embodiment, CAN frame information may include only data, instead.

(8) Procedures of the various processes described in the above embodiments (e.g., the certain procedure illustrated in FIGS. 10 and 11, etc.) need not necessarily be performed in the above-described order. The order in which the procedures are performed may be switched, a plurality of procedures may be performed in parallel with each other, or a part of a procedure may be omitted, instead.

(9) The devices such as the gateways, the ECUs, and the E-hub in the above embodiments may include other hardware components such as a hard disk device, a display, a keyboard, and a mouse. In addition, a program stored in a memory may be executed by a processor in order to achieve a function of each device in a software manner, or dedicated hardware (a digital circuit, etc.) may achieve the function. Distribution of functions of the components of each device may also be changed.

(10) Some or all of the components of each device in the above embodiments may be configured by a single system large-scale integration (LSI) circuit. A system LSI circuit is a super-multifunctional LSI circuit fabricated by integrating a plurality of components on a single chip and is specifically a computer system including a microprocessor, a ROM, and a RAM. The RAM stores a computer program. The system LSI circuit achieves functions thereof when the microprocessor operates in accordance with the computer program. Alternatively, each of the components of each device may be achieved by a single chip, or some or all of the components of each device may be achieved by a single chip. Although system LSI has been used here, integrated circuit (IC), LSI, super LSI, or ultra LSI might be used depending on a degree of integration. In addition, some or all of the components of each device in the above embodiments need not necessarily be achieved by an LSI circuit and may be achieved by a dedicated circuit or a general-purpose processor, instead. A field-programmable gate array (FPGA) that can be programmed after an LSI circuit is fabricated or a reconfigurable processor capable of reconfiguring connections and settings of circuit cells inside an LSI circuit may be used, instead. Furthermore, it is needless to say that if a technique for fabricating an integrated circuit that replaces LSI becomes available as a result of evolution of semiconductor technologies or derivative techniques, the functional blocks may be integrated using the technique. Application of biotechnology is one of such possibilities.

(11) Some or all of the components of each device may be achieved by an IC card or a separate module removably attached to each device. The IC card or the module is a computer system including a microprocessor, a ROM, and a RAM. The IC card or the module may include the super-multifunctional LSI circuit. The IC card or the module achieves functions thereof when the microprocessor operates in accordance with a computer program. The IC card or the module may be tamper-resistant.

(12) An aspect of the present disclosure may be, for example, a transfer method including the entirety or a part of the processing procedure illustrated in FIGS. 10 and 11 or the like. For example, the transfer method is used by a gateway connected to a bus of a first network through which a frame of a first type is transmitted in accordance with a first communication protocol using the bus and a second network through which a frame of a second type is transmitted in accordance with a second communication protocol, which is different from the first communication protocol. The transfer method includes a reception step (e.g., step S2) of sequentially receiving the frame of the first type from the bus, a determination step (e.g., step S8) of determining whether to transmit data regarding the frame of the first type received in the reception step to the second network, and a transmission step (e.g., steps S16 to S18) of transmitting, to the second network, the frame of the second type including data regarding a plurality of frames of the first type determined in the determination step to be transmitted to the second network. In addition, an aspect of the present disclosure may be a program (computer program) for achieving this method using a computer or a digital signal including the computer program. For example, an aspect of the present disclosure may be a program for performing a certain transfer process including the reception step, the determination step, and the transmission step of the transfer method. In addition, an aspect of the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, an aspect of the present disclosure may be the digital signal stored in the recording medium. In addition, an aspect of the present disclosure may be the computer program or the digital signal transmitted through an electrical communication line, a wireless or wired communication line, a network typified by the Internet, datacasting, or the like. In addition, an aspect of the present disclosure may be a computer system including a microprocessor and a memory. The memory may store the computer program, and the microprocessor may operate in accordance with the compute program. In addition, an aspect of the present disclosure may be implemented by another independent computer system by storing the program or the digital signal in the recording medium and transporting the recording medium or by transporting the program or the digital signal through the network or the like.

(13) The scope of the present disclosure also includes modes obtained by combining the components and the functions described in the above embodiments and modifications in any manner.

The present disclosure can be used to transmit information transmitted from an ECU connected to a bus of a first network such as a CAN to another ECU through a second network such as Ethernet (registered trademark).

What is claimed is:

1. A gateway device connected to a first network through which a frame of a first type is transmitted using the first network in accordance with a first communication protocol and connected to a second network through which a frame of a second type is transmitted in accordance with a second communication protocol, which is different from the first communication protocol, the gateway device comprising:
   a receiver that sequentially receives frames of the first type from the first network;
   a processor that determines whether to transmit data regarding the frames of the first type received by the receiver to the second network; and
   a transmitter that transmits, to the second network, the frame of the second type including data regarding a plurality of the frames of the first type determined by the processor to be transmitted to the second network,
   wherein the first network and the second network are vehicle networks,
   wherein the gateway device is connected to an Ethernet (registered trademark) cable included in the second network,
   wherein the first communication protocol is a controller area network protocol,
   wherein the second communication protocol is an Ethernet (registered trademark) protocol,
   wherein the frame of the first type includes a controller area network identifier and, in a data field, data,
   wherein the frame of the second type is an Ethernet (registered trademark) frame including an Ethernet (registered trademark) header and a payload, wherein the transmitter transmits the frame of the second type to the second network by outputting the frame of the second type to the Ethernet (registered trademark) cable, and wherein the transmitter transmits the frame of the second type including the data regarding the plurality of the frames of the first type when a condition relating to a number of frames of the first type received by the receiver is satisfied.

2. The gateway device according to claim 1,
wherein the processor determines, on a basis of the controller area network identifier of each of the frames of the first type received by the receiver, whether to transmit data regarding the frames of the first type to the second network.

3. The gateway device according to claim 2,
wherein the processor refers to reference information in which a plurality of destinations is associated with controller area network identifiers and selects, on the basis of the controller area network identifier of each of the frames of the first type received by the receiver, one of the plurality of destinations as a destination of the data regarding the plurality of the frames of the first type to be transmitted to the second network, and
wherein the transmitter transmits, to the second network, the frame of the second type including the data regarding the plurality of the frames of the first type whose destinations selected by the processor are same.

4. The gateway device according to claim 3,
wherein the frame of the second type transmitted by the transmitter includes destination information indicating the same destinations selected by the processor.

5. The gateway device according to claim 4,
wherein, in the reference information, a plurality of media access control addresses as the plurality of destinations is associated with the controller area network identifiers, and
wherein the frame of the second type transmitted by the transmitter includes the data regarding the plurality of the frames of the first type having the same destinations selected by the processor in the payload, a media access control address, which is the same destinations, as the destination information, and a destination media access control address in an Ethernet (registered trademark) header.

6. The gateway device according to claim 3,
wherein the gateway device is connected to a plurality of buses of the first network,
wherein the plurality of destinations, the plurality of buses, and the controller area network identifiers are associated in the reference information, and
wherein the processor refers to the reference information and selects, on the basis of the controller area network identifier and a source bus of each of the frames of the first type received by the receiver, one of the plurality of destinations as the destination of the data regarding the plurality of the frames of the first type to be transmitted to the second network.

7. The gateway device according to claim 2,
wherein the processor refers to reference information in which a plurality of destinations is associated with controller area network identifiers and selects, on the basis of the controller area network identifier of each of the frames of the first type received by the receiver, one of the plurality of destinations as a destination of the data regarding the plurality of the frames of the first type to be transmitted to the second network, and wherein the transmitter transmits the frame of the second type including the data regarding the plurality of the frames of the first type determined by the processor to be transmitted to the second network and transmits destination information indicating the destination selected by the processor in the payload.

8. The gateway device according to claim 2,
wherein the gateway device is connected to a plurality of Ethernet (registered trademark) cables,
wherein the processor refers to reference information in which the plurality of cables is associated with controller area network identifiers and selects, on the basis of the controller area network identifier of each of the frames of the first type received by the receiver, one of the plurality of Ethernet (registered trademark) cables as a destination of the data regarding the plurality of the frames of the first type to be transmitted to the second network, and
wherein the transmitter transmits the frame of the second type including the data regarding the plurality of the frames of the first type whose Ethernet (registered trademark) cables selected by the processor as destinations are same, to the one of the plurality of Ethernet (registered trademark) cables.

9. The gateway device according to claim 1,
wherein, in the frame of the second type, the data regarding the plurality of the frames of the first type determined by the processor to be transmitted to the second network is arranged in order of predetermined priority levels of controller area network identifiers based on controller area network identifiers of the plurality of the frames of the first type.

10. The gateway device according to claim 1,
wherein, in the frame of the second type, the data regarding the plurality of the frames of the first type determined by the processor to be transmitted to the second network is arranged in order of reception by the receiver.

11. The gateway device according to claim 1,
wherein, when the controller area network identifier of one of the frames of the first type received by the receiver is a particular identifier, the transmitter transmits, to the second network, a frame of the second type including data regarding the one of the frames of the first type having the particular identifier even when the condition is not satisfied.

12. The gateway device according to claim 11,
wherein, when transmitting the frame of the second type including the data regarding the one of the frames of the first type having the particular identifier, the transmitter:
transmits the frame of the second type and includes data regarding a second one of the frames of the first type that does not have the particular identifier and that has been determined by the processor to be transmitted to the second network and has not yet been transmitted; or
transmits another frame of the second type including the data regarding the second one of the frames of the first type that does not have the particular identifier and that has been determined by the processor to be transmitted to the second network and has not yet been transmitted.

13. The gateway device according to claim 1,
wherein the transmitter transmits the frame of the second type when a condition relating to time is satisfied as a result of counting of the time.

14. The gateway device according to claim 1,
wherein the plurality of the frames of the first type determined by the processor to be transmitted to the second network include a same destination.

15. A vehicle network system, comprising:
a plurality of electronic control units of a first type connected to a first network through which a frame of a first type is transmitted in accordance with a first communication protocol;
an electronic control unit of a second type connected to a second network through which a frame of a second type is transmitted in accordance with a second communication protocol, which is different from the first communication protocol; and
a gateway device connected to the first network and the second network,
wherein the gateway device includes:
a receiver that sequentially receives frames of the first type from the first network;
a processor that determines whether to transmit data regarding the frames of the first type received by the receiver to the second network; and
a transmitter that transmits, to the second network, the frame of the second type including data regarding a plurality of the frames of the first type determined by the processor to be transmitted to the second network,
wherein the first network and the second network are vehicle networks,
wherein the gateway device is connected to an Ethernet (registered trademark) cable included in the second network,
wherein the first communication protocol is a controller area network protocol,
wherein the second communication protocol is an Ethernet (registered trademark) protocol,
wherein the frame of the first type includes a controller area network identifier and, in a data field, data,
wherein the frame of the second type is an Ethernet (registered trademark) frame including an Ethernet (registered trademark) header and a payload,
wherein the transmitter transmits the frame of the second type to the second network by outputting the frame of the second type to the Ethernet (registered trademark) cable, and
wherein the transmitter transmits the frame of the second type including the data regarding the plurality of the frames of the first type when a condition relating to a number of frames of the first type received by the receiver is satisfied.

16. A transfer method of a gateway device connected to a first network through which a frame of a first type is transmitted using the first network in accordance with a first communication protocol and connected to a second network through which a frame of a second type is transmitted in accordance with a second communication protocol, which is different from the first communication protocol, the transfer method comprising:
sequentially receiving frames of the first type from the first network;
determining, by a processor, whether to transmit data regarding the frames of the first type received in the sequentially receiving to the second network; and
transmitting, to the second network, the frame of the second type including data regarding a plurality of the frames of the first type determined by the processor in the determining to be transmitted to the second network,
wherein the first network and the second network are vehicle networks,
wherein the gateway device is connected to an Ethernet (registered trademark) cable included in the second network,
wherein the first communication protocol is a controller area network protocol,
wherein the second communication protocol is an Ethernet (registered trademark) protocol,
wherein the frame of the first type includes a controller area network identifier and, in a data field, data,
wherein the frame of the second type is an Ethernet (registered trademark) frame including an Ethernet (registered trademark) header and a payload,
wherein the frame of the second type is transmit to the second network by being output to the Ethernet (registered trademark) cable, and
wherein the frame of the second type is transmit to the second network and includes the data regarding the plurality of the frames of the first type when a condition relating to a number of frames of the first type received by the sequentially receiving is satisfied.

17. A non-transitory computer-readable recording medium storing a program for causing a gateway device that is connected to a first network through which a frame of a first type is transmitted using the first network in accordance with a first communication protocol and connected to a second network through which a frame of a second type is transmitted in accordance with a second communication protocol, which is different from the first communication protocol, to perform operations comprising:
sequentially receiving frames of the first type from the first network;
determining whether to transmit data regarding the frames of the first type received in the receiving to the second network; and
transmitting, to the second network, the frame of the second type including data regarding a plurality of the frames of the first type determined in the determining to be transmitted to the second network,
wherein the first network and the second network are vehicle networks,
wherein the gateway device is connected to an Ethernet (registered trademark) cable included in the second network,
wherein the first communication protocol is a controller area network protocol,
wherein the second communication protocol is an Ethernet (registered trademark) protocol,
wherein the frame of the first type includes a controller area network identifier and, in a data field, data,
wherein the frame of the second type is an Ethernet (registered trademark) frame including an Ethernet (registered trademark) header and a payload,
wherein the frame of the second type is transmit to the second network by being output to the Ethernet (registered trademark) cable, and
wherein the frame of the second type is transmit to the second network and includes the data regarding the plurality of the frames of the first type when a condition relating to a number of frames of the first type received by the sequentially receiving is satisfied.

* * * * *